(12) United States Patent
Sun et al.

(10) Patent No.: US 10,903,941 B2
(45) Date of Patent: Jan. 26, 2021

(54) RETRANSMISSION PROCESSING METHOD AND APPARATUS

(71) Applicant: HUAWEI TECHNOLOGIES CO., LTD., Guangdong (CN)

(72) Inventors: Wenqi Sun, Shenzhen (CN); Wei Tan, Shanghai (CN); Yinghao Jin, Shanghai (CN); Feng Han, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 61 days.

(21) Appl. No.: 16/272,527

(22) Filed: Feb. 11, 2019

(65) Prior Publication Data

US 2019/0190657 A1 Jun. 20, 2019

Related U.S. Application Data

(63) Continuation of application No. PCT/CN2017/093300, filed on Jul. 18, 2017.

(30) Foreign Application Priority Data

Aug. 11, 2016 (CN) .......................... 2016 1 0664988

(51) Int. Cl.
*H04L 1/08* (2006.01)
*H04L 1/16* (2006.01)
(Continued)

(52) U.S. Cl.
CPC .............. *H04L 1/08* (2013.01); *H04L 1/1685* (2013.01); *H04L 1/1858* (2013.01); *H04L 2001/0097* (2013.01)

(58) Field of Classification Search
CPC ....... H04L 1/08; H04L 1/1858; H04L 1/1685; H04L 2001/0097
See application file for complete search history.

(56) References Cited

U.S. PATENT DOCUMENTS 9,014,010 B2 4/2015 Yi et al.
9,706,418 B2 7/2017 Decarreau et al.
(Continued)

FOREIGN PATENT DOCUMENTS

CN 103155634 A 6/2013
CN 103875192 A 6/2014
(Continued)

OTHER PUBLICATIONS

N. Janatian, M. Modarres-Hashemi and S. Sun, "Joint versus separate spectrum sensing and resource allocation in OFDMA-based cognitive radio networks," in IET Communications, vol. 10, No. 7, pp. 839-847, 5 5 2016. (Year: 2016).*

(Continued)

*Primary Examiner* — Cynthia Britt
(74) *Attorney, Agent, or Firm* — Leydig, Voit & Mayer, Ltd.

(57) ABSTRACT

Embodiments of this application disclose a retransmission processing method and apparatus. The method includes: sending, by a master base station, instruction information to a first secondary base station, where the instruction information is used to instruct the first secondary base station to send feedback information to the master base station after the first secondary base station sends data to user equipment; receiving, by the master base station, the feedback information sent by the first secondary base station according to the instruction information; and performing, by the master base station, retransmission processing on the data according to the feedback information.

14 Claims, 11 Drawing Sheets

(51) Int. Cl.
H04L 1/18 (2006.01)
H04L 1/00 (2006.01)

(56) References Cited

U.S. PATENT DOCUMENTS

| | | | |
|---|---|---|---|
| 2012/0052795 A1* | 3/2012 | Shen | H04L 1/1854 |
| | | | 455/7 |
| 2013/0188575 A1 | 7/2013 | Lee et al. | |
| 2013/0242913 A1 | 9/2013 | Lan et al. | |
| 2015/0358957 A1* | 12/2015 | Kim | H04W 48/08 |
| | | | 455/450 |
| 2016/0182276 A1* | 6/2016 | Wu | H04W 76/19 |
| | | | 370/225 |
| 2016/0183103 A1 | 6/2016 | Saily et al. | |
| 2017/0041100 A1 | 2/2017 | Xie et al. | |
| 2017/0055166 A1* | 2/2017 | Shi | H04L 5/0032 |
| 2017/0289879 A1* | 10/2017 | Wang | H04W 76/15 |
| 2019/0274179 A1* | 9/2019 | Vajapeyam | H04W 36/30 |
| 2019/0289598 A1* | 9/2019 | Shimezawa | H04L 5/001 |

FOREIGN PATENT DOCUMENTS

| | | |
|---|---|---|
| CN | 103973413 A | 8/2014 |
| CN | 104753627 A | 7/2015 |
| CN | 105577333 A | 5/2016 |
| CN | 105612804 A | 5/2016 |
| CN | 103875192 B | 8/2018 |
| EP | 2051454 A1 | 4/2009 |
| WO | 2014056198 A1 | 4/2014 |
| WO | 2015167546 A1 | 11/2015 |

OTHER PUBLICATIONS

A. Mukherjee, "Optimal flow bifurcation in networks with dual base station connectivity and non-ideal backhaul," 2014 48th Asilomar Conference on Signals, Systems and Computers, Pacific Grove, CA, 2014, pp. 521-524. (Year: 2014).*
3GPP TS 36.322 V13.2.0 (Jun. 2016),"3rd Generation Partnership Project; Technical Specification Group Radio Access Network; Evolved Universal Terrestrial Radio Access (E-UTRA); Radio Link Control (RLC) protocol specification" (Release 13), total 45 pages.
3GPP TS 36.323 V13.2.1 (Jun. 2016),"3rd Generation Partnership Project; Technical Specification Group Radio Access Network; Evolved Universal Terrestrial Radio Access (E-UTRA); Packet Data Convergence Protocol (PDCP) specification" (Release 13), total 39 pages.
International Search Report dated Sep. 30, 2017 in corresponding International Patent Application No. PCT/CN2017/093300 (7 pages).
Written Opinion of the International Searching Authority dated Sep. 30, 2017 in corresponding International Patent Application No. PCT/CN2017/093300 (5 pages).
International Search Report dated Sep. 30, 2017 in corresponding International Application No. PCT/CN2017/093300.

* cited by examiner

| D/C | P | R | R | R | R | PDCP SN |
|---|---|---|---|---|---|---|
| PDCP SN ||||||||
| PDCP SN ||||||||
| Data ||||||||

FIG. 6

RETRANSMISSION PROCESSING METHOD AND APPARATUS

CROSS-REFERENCE TO RELATED APPLICATIONS

This application is a continuation of International Application No. PCT/CN2017/093300, filed on Jul. 18, 2017, which claims priority to Chinese Patent Application No. 201610664988.0, filed on Aug. 11, 2016. The disclosures of the aforementioned applications are hereby incorporated by reference in their entireties.

TECHNICAL FIELD

This application relates to the communications field, and in particular, to a retransmission processing method and apparatus.

BACKGROUND

Rapid development of the mobile Internet is accompanied with an explosive increase in mobile traffic. To cope with traffic pressure, network devices are more densely deployed and heterogeneous deployment of a macrocell and a small cell is more extensive. To enable user equipment to use resources of both the macrocell and the small cell, a multi-connection concept is put forward in fifth generation mobile communications technology (5G) new radio (New Radio, NR) discussed in the current 3rd Generation Partnership Project (3rd Generation Partnership Project, 3GPP). Being similar to a dual connection, radio resources on a plurality of base stations are used to provide a service for one user equipment.

In an existing dual connection, a master base station (Master evolved NodeB, MeNB) allocates data to a secondary base station. The secondary base station sends inquiry information to user equipment, determines, according to response information that is sent by the user equipment and that is for the inquiry information, whether the data needs to be retransmitted, and after the data is successfully transmitted, feeds back data transmission success information to the master base station.

If an existing retransmission mechanism is applied to a 5G NR multi-connection scenario, a retransmission occasion is inflexible. When a secondary base station fails to send data, a master base station may not detect the transmission failure of the secondary base station in time, and therefore cannot initiate retransmission by using another secondary base station with relatively desirable transmission quality. Consequently, user equipment has a relatively large receiving latency.

SUMMARY

In view of the above, embodiments of this application provide a retransmission processing method and apparatus, so that a problem that a receiving latency of user equipment is relatively large due to an inflexible retransmission occasion can be overcome.

According to a first aspect, a retransmission processing method is provided, and the method includes: sending, by a master base station, instruction information to a first secondary base station, where the instruction information is used to instruct the first secondary base station to send feedback information to the master base station after the first secondary base station sends data to user equipment; receiving, by the master base station, the feedback information sent by the first secondary base station according to the instruction information, where the feedback information is used to indicate that the first secondary base station has sent the data to the user equipment; and performing, by the master base station, retransmission processing on the data according to the feedback information.

Optionally, retransmission processing may include the following cases: When the master base station estimates, according to the feedback information, that the data sent by the first secondary base station is successfully transmitted, the master base station may not retransmit the data sent by the first secondary base station; when the master base station estimates, according to the feedback information, that the data sent by the first secondary base station is unsuccessfully transmitted, the master base station may determine that the data sent by the first secondary base station needs to be retransmitted, so that the master base station can select a specific secondary base station to retransmit the unsuccessfully transmitted data.

Optionally, the data sent by the first secondary base station may be all or some of data allocated by the master base station. This is not limited in this application.

The secondary base station is instructed to immediately send a feedback to the master base station after the secondary base station sends the data to the user equipment, so that the master base station can master a sending status of each secondary base station in time, and the master base station performs retransmission processing when estimating a data loss on a link. In this way, multi-connection flexibility is fully used, so that a problem that a reordering latency of the user equipment is relatively large due to an inflexible retransmission occasion can be overcome.

With reference to the first aspect, in a first possible implementation of the first aspect, the method further includes: sending, by the master base station, inquiry information to the user equipment according to the feedback information, where the inquiry information is used to inquire whether the user equipment correctly receives the data sent by the first secondary base station; and receiving, by the master base station, response information that is sent by the user equipment and that is for the inquiry information; and the performing, by the master base station, retransmission processing according to the feedback information includes: performing, by the master base station, retransmission processing on the data according to the response information for the inquiry information determined according to the feedback information.

Optionally, there may be one or more first secondary base stations. The master base station may inquire of the user equipment about whether data sent by the master base station to the user equipment is correctly received. The master base station may further inquire of the user equipment about sending statuses of a plurality of base stations once, and the plurality of base stations may include the master base station and a plurality of secondary base stations. However, the user equipment may provide the transmission statuses of the plurality of base stations in the response information for the inquiry information.

The master base station sends the inquiry information to the user equipment according to the feedback information, and performs retransmission processing according to the received response information for the inquiry information, so that the master base station can detect, in time, whether each secondary base station loses data, and initiate retransmission by using another secondary base station with relatively desirable transmission quality when the data is lost.

This can fully use multi-connection flexibility, so that a reordering latency is shortened.

With reference to the possible implementation of the first aspect, in a second possible implementation of the first aspect, the instruction information is further used to instruct the first secondary base station not to perform retransmission processing on the data sent by the first secondary base station.

The secondary base station is instructed not to perform retransmission processing, and the master base station may inquire of the user equipment about transmission statuses of a plurality of secondary base stations once. This avoids an air interface resource waste caused by interaction between each secondary base station and the user equipment.

With reference to the possible implementations of the first aspect, in a third possible implementation of the first aspect, the performing, by the master base station, retransmission processing on the data according to the response information for the inquiry information determined according to the feedback information includes: determining, by the master base station according to the response information for the inquiry information, that the user equipment does not correctly receive the data sent by the first secondary base station; and sending, by the master base station, the data to a second secondary base station, where the second secondary base station is configured to send the data to the user equipment.

When an amount of lost data is relatively large, the master base station may select a suitable secondary base station for retransmission based on a data loss situation. This avoids a relatively large reordering latency caused by continuous use of a secondary base station in an undesirable transmission status.

With reference to the possible implementations of the first aspect, in a fourth possible implementation of the first aspect, the performing, by the master base station, retransmission processing on the data according to the response information for the inquiry information determined according to the feedback information includes: determining, by the master base station according to the response information for the inquiry information, that the user equipment does not correctly receive the data sent by the first secondary base station; and sending, by the master base station, a notification message to the first secondary base station, where the notification message is used to instruct the first secondary base station to resend the data to the user equipment.

When individual data is lost, rather than data is lost due to an unstable link, the data is retransmitted by using an original secondary base station. This can reduce interface traffic between base stations.

With reference to the possible implementations of the first aspect, in a fifth possible implementation of the first aspect, the sending, by the master base station, inquiry information to the user equipment according to the feedback information includes: sending, by the master base station, the inquiry information through a third secondary base station; and the receiving, by the master base station, response information that is sent by the user equipment and that is for the inquiry information includes: receiving, by the master base station through the third secondary base station, the response information that is sent by the user equipment and that is for the inquiry information.

Optionally, the third secondary base station may be the first secondary base station, may be the second secondary base station, or may be any secondary base station in a multi-connection scenario. The master base station may directly send the inquiry information to the user equipment, and the user equipment directly sends the response information for the inquiry information to the master base station.

With reference to the possible implementations of the first aspect, in a sixth possible implementation of the first aspect, before the receiving, by the master base station, response information that is sent by the user equipment and that is for the inquiry information, the method further includes: instructing, by the master base station, the user equipment to send the response information for the inquiry information to the master base station through a fourth secondary base station.

Optionally, the fourth secondary base station may be the first secondary base station, may be the second secondary base station, may be the third secondary base station, or may be any secondary base station in the multi-connection scenario. The master base station may instruct the user equipment to directly send the response information for the inquiry information to the master base station.

The master base station guides the user equipment, and may dynamically or statically indicate a path on which the user equipment sends the response information, so that the response information can be transmitted on a more reliable path, and multi-connection flexibility is fully used.

With reference to the possible implementations of the first aspect, in a seventh possible implementation of the first aspect, the sending, by the master base station, inquiry information to the user equipment according to the feedback information includes: sending, by the master base station, the inquiry information to the user equipment according to the feedback information and a status of a transmit window of the first secondary base station.

Optionally, after receiving the feedback information, the master base station may determine the status of the transmit window of the secondary base station in this case. If the transmit window is not blocked, the master base station may not send the inquiry information to the user equipment; or if the transmit window is blocked in this case, the master base station sends the inquiry information to the user equipment.

Optionally, the instruction information may be carried in an addition request message or a modification request message sent by the master base station to the secondary base station, and the feedback information may be carried in a downlink data transmission status message.

According to a second aspect, a retransmission processing method is provided, and the method includes: receiving, by a first secondary base station, instruction information sent by a master base station, where the instruction information is used to instruct the first secondary base station to send feedback information to the master base station after the first secondary base station sends first data to user equipment; and sending, by the first secondary base station, the feedback information to the master base station according to the instruction information after sending the first data to the user equipment, where the feedback information is used by the master base station to perform retransmission processing on the first data.

The secondary base station is instructed to immediately send a feedback to the master base station after the secondary base station sends the data to the user equipment, so that the master base station can master a sending status of each secondary base station in time. Therefore, a problem of an inflexible retransmission occasion can be overcome.

With reference to the second aspect, in a first possible implementation of the second aspect, the instruction information is further used to instruct the first secondary base station not to perform retransmission processing on the first data sent by the first secondary base station, and the method further includes: skipping, by the first secondary base station, performing retransmission processing on the first data according to the instruction information.

The secondary base station is instructed not to perform retransmission processing, and the master base station may inquire of the user equipment about transmission statuses of a plurality of secondary base stations once. This avoids an air interface resource waste caused by interaction between each secondary base station and the user equipment.

With reference to the possible implementation of the second aspect, in a second possible implementation of the second aspect, the method further includes: receiving, by the first secondary base station, a notification message sent by the master base station, where the notification message is used to instruct the first secondary base station to resend the first data to the user equipment.

When individual data is lost, rather than data is lost due to an unstable link, the data is retransmitted by using an original secondary base station. This can reduce interface traffic between base stations.

With reference to the possible implementations of the second aspect, in a third possible implementation of the second aspect, the method further includes: receiving, by the first secondary base station, second data that is sent by the master base station and that is unsuccessfully transmitted by a second secondary base station; and sending, by the first secondary base station, the second data to the user equipment.

When an amount of lost data is relatively large, the master base station may select a suitable secondary base station for retransmission based on a data loss situation. This avoids a relatively large reordering latency caused by continuous use of a secondary base station in an undesirable transmission status.

According to a third aspect, a retransmission processing method is provided, and the method includes: receiving, by user equipment, inquiry information sent by a master base station according to feedback information, where the feedback information is used to indicate that a first secondary base station has sent data to the user equipment, and the inquiry information is used to inquire whether the user equipment correctly receives the data sent by the first secondary base station; and sending, by the user equipment, response information for the inquiry information to the master base station.

The user equipment receives the inquiry information sent by the master base station according to the feedback information, and sends the response information for the inquiry information to the master base station, so that the master base station can detect, in time, whether each secondary base station loses data, and initiate retransmission by using another secondary base station with relatively desirable transmission quality when the data is lost. This can fully use multi-connection flexibility, so that a reordering latency is shortened.

With reference to the third aspect, in a first possible implementation of the third aspect, the receiving, by user equipment, inquiry information sent by a master base station includes: receiving, by the user equipment, the inquiry information sent by the master base station by using a second secondary base station; and the sending, by the user equipment, response information for the inquiry information to the master base station includes: sending, by the user equipment, the response information for the inquiry information to the master base station by using the second secondary base station.

With reference to the possible implementation of the third aspect, in a second possible implementation of the third aspect, before the sending, by the user equipment, response information for the inquiry information to the master base station, the method further includes: receiving, by the user equipment, instruction information sent by the master base station, where the instruction information is used to instruct the user equipment to send the response information for the inquiry information to the master base station through a third secondary base station.

The master base station guides the user equipment, and may dynamically or statically indicate a path on which the user equipment sends the response information, so that the response information can be transmitted on a more reliable path, and multi-connection flexibility is fully used.

According to a fourth aspect, a retransmission processing method is provided, and the method includes: receiving, by a Packet Data Convergence Protocol PDCP entity of user equipment, feedback information sent by a first Radio Link Control RLC entity of the user equipment, where the feedback information is used to indicate that the first RLC entity has sent data to a master base station; and performing, by the PDCP entity of the user equipment, retransmission processing on the data according to the feedback information.

Optionally, retransmission processing may include the following cases: When the PDCP entity of the user equipment estimates, according to the feedback information, that the data sent by the first RLC entity is successfully transmitted, the PDCP entity of the user equipment may not retransmit the data sent by the first RLC entity. When the PDCP entity of the user equipment estimates, according to the feedback information, that the data sent by the first RLC entity is unsuccessfully transmitted, the PDCP entity of the user equipment may determine that the data sent by the first RLC entity needs to be retransmitted, so that the PDCP entity of the user equipment can select a specific RLC entity to retransmit the unsuccessfully transmitted data.

Optionally, the data sent by the first RLC entity may be all or some of data allocated by the PDCP entity of the user equipment. This is not limited in this application.

The RLC entity of the user equipment immediately sends a feedback to the PDCP entity of the user equipment after sending the data to the master base station, so that the PDCP entity of the user equipment can master a sending status of each RLC entity of the user equipment in time. Therefore, a problem of an inflexible retransmission occasion can be overcome.

With reference to the fourth aspect, in a first possible implementation of the fourth aspect, the method further includes: sending, by the PDCP entity of the user equipment, inquiry information to the master base station according to the feedback information, where the inquiry information is used to inquire whether the master base station correctly receives the data sent by the first RLC entity of the user equipment; and receiving, by the PDCP entity of the user equipment, response information that is sent by the master base station and that is for the inquiry information; and the performing, by the PDCP entity of the user equipment, retransmission processing according to the feedback information includes: performing, by the PDCP entity of the user equipment, retransmission processing on the data according to the response information for the inquiry information determined according to the feedback information.

Optionally, there may be one or more first RLC entities. The PDCP entity of the user equipment may inquire of the master base station about transmission statuses of a plurality of RLC entities once. The master base station provides the transmission statuses of the plurality of RLC entities in the response information for the inquiry information.

The PDCP entity of the user equipment sends the inquiry information to the master base station according to the feedback information, and performs retransmission processing according to the received response information for the inquiry information, so that the PDCP entity of the user equipment can detect, in time, whether each RLC entity loses data, and initiate retransmission by using another RLC entity with relatively desirable transmission quality when the data is lost. This can fully use multi-connection flexibility, so that a reordering latency is shortened.

With reference to the possible implementation of the fourth aspect, in a second possible implementation of the fourth aspect, the performing, by the PDCP entity of the user equipment, retransmission processing on the data according to the response information for the inquiry information determined according to the feedback information includes: determining, by the PDCP entity of the user equipment according to the response information for the inquiry information, that the master base station does not correctly receive the data sent by the first RLC entity of the user equipment; and sending, by the PDCP entity of the user equipment, the data to a second RLC entity of the user equipment, where the second RLC entity of the user equipment is configured to send the data to the master base station.

When an amount of lost data is relatively large, the PDCP entity of the user equipment may select a suitable RLC entity for retransmission based on a data loss situation. This avoids a reordering latency caused by continuous use of an RLC entity in an undesirable transmission status.

With reference to the possible implementations of the fourth aspect, in a third possible implementation of the fourth aspect, the performing, by the PDCP entity of the user equipment, retransmission processing according to the response information for the inquiry information determined according to the feedback information includes: determining, by the PDCP entity of the user equipment according to the response information for the inquiry information, that the master base station does not correctly receive the data sent by the first RLC entity of the user equipment; and sending, by the PDCP entity of the user equipment, a notification message to the first RLC entity of the user equipment, where the notification message is used to instruct the first RLC entity of the user equipment to resend the data to the master base station.

With reference to the possible implementations of the fourth aspect, in a fourth possible implementation of the fourth aspect, the sending, by the PDCP entity of the user equipment, inquiry information to the master base station according to the feedback information includes: sending, by the PDCP entity of the user equipment, the inquiry information to the master base station according to the feedback information and a status of a transmit window of the first RLC entity of the user equipment.

Optionally, after receiving the feedback information, the PDCP entity of the user equipment may determine the status of the transmit window of the first RLC entity in this case. If the transmit window is not blocked, the PDCP entity of the user equipment may not send the inquiry information to the master base station; or if the transmit window is blocked in this case, the PDCP entity of the user equipment sends the inquiry information to the master base station.

According to a fifth aspect, a retransmission processing method is provided, and the method includes: receiving, by a first RLC entity of user equipment, instruction information sent by a master base station, where the instruction information is used to instruct the first RLC entity of the user equipment to send feedback information to a PDCP entity of the user equipment after the first RLC entity of the user equipment sends first data to the master base station; and sending, by the first RLC entity of the user equipment, the feedback information to the PDCP entity of the user equipment according to the instruction information after sending the first data to the master base station, where the feedback information is used by the PDCP entity of the user equipment to perform retransmission processing on the first data.

The RLC entity of the user equipment is instructed to immediately send a feedback to the PDCP entity of the user equipment after sending the data to the master base station, so that the PDCP entity of the user equipment can master a transmission status of each RLC entity in time. Therefore, a problem of an inflexible retransmission occasion can be overcome.

With reference to the fifth aspect, in a first possible implementation of the fifth aspect, the instruction information is further used to instruct the first RLC entity of the user equipment not to perform retransmission processing on the first data sent by the first RLC entity, and the method further includes: skipping, by the first RLC entity of the user equipment, performing retransmission processing on the first data according to the instruction information.

The RLC entity of the user equipment is instructed not to perform retransmission processing, and the PDCP entity of the user equipment may inquire of the master base station about transmission statuses of a plurality of RLC entities once. This avoids an air interface resource waste caused by interaction between each RLC entity and the master base station.

With reference to the possible implementation of the fifth aspect, in a second possible implementation of the fifth aspect, the method further includes: receiving, by the first RLC entity of the user equipment, a notification message sent by the PDCP entity of the user equipment, where the notification message is used to instruct the first RLC entity of the user equipment to resend the first data to the master base station.

With reference to the possible implementations of the fifth aspect, in a third possible implementation of the fifth aspect, the method further includes: receiving, by the first RLC entity of the user equipment, second data that is sent by the PDCP entity of the user equipment and that is unsuccessfully transmitted by a second RLC entity of the user equipment; and sending, by the first RLC entity of the user equipment, the second data to the master base station.

When an amount of lost data is relatively large, the PDCP entity of the user equipment may select a suitable RLC entity for retransmission based on a data loss situation. This avoids a relatively large reordering latency caused by continuous use of an RLC entity in an undesirable transmission status.

According to a sixth aspect, a retransmission processing method is provided, and the method includes: receiving, by a master base station, inquiry information sent by a PDCP entity of user equipment according to feedback information, where the feedback information is used to indicate that a first RLC entity of the user equipment has sent data to the master base station, and the inquiry information is used to inquire whether the master base station correctly receives the data sent by the first RLC entity; and sending, by the master base station, response information for the inquiry information to the PDCP entity of the user equipment.

The master base station receives the inquiry information sent by the PDCP entity of the user equipment according to the feedback information, and sends the response information for the inquiry information to the PDCP entity of the user equipment, so that the PDCP entity of the user equipment can detect, in time, whether each RLC entity loses data, and initiate retransmission by using another RLC entity with relatively desirable transmission quality when the data is lost. This can fully use multi-connection flexibility, so that a reordering latency is shortened.

According to a seventh aspect, a retransmission processing apparatus is provided, configured to perform the method in any one of the first aspect or the possible implementations of the first aspect. Specifically, the apparatus includes units configured to perform the method in any one of the first aspect or the possible implementations of the first aspect.

According to an eighth aspect, a retransmission processing apparatus is provided, configured to perform the method in any one of the second aspect or the possible implementations of the second aspect. Specifically, the apparatus includes units configured to perform the method in any one of the second aspect or the possible implementations of the second aspect.

According to a ninth aspect, a retransmission processing apparatus is provided, configured to perform the method in any one of the third aspect or the possible implementations of the third aspect. Specifically, the apparatus includes units configured to perform the method in any one of the third aspect or the possible implementations of the third aspect.

According to a tenth aspect, a retransmission processing apparatus is provided, configured to perform the method in any one of the fourth aspect or the possible implementations of the fourth aspect. Specifically, the apparatus includes units configured to perform the method in any one of the fourth aspect or the possible implementations of the fourth aspect.

According to an eleventh aspect, a retransmission processing apparatus is provided, configured to perform the method in any one of the fifth aspect or the possible implementations of the fifth aspect. Specifically, the apparatus includes units configured to perform the method in any one of the fifth aspect or the possible implementations of the fifth aspect.

According to a twelfth aspect, a retransmission processing apparatus is provided, configured to perform the method in any one of the sixth aspect or the possible implementations of the sixth aspect. Specifically, the apparatus includes units configured to perform the method in any one of the sixth aspect or the possible implementations of the sixth aspect.

According to a thirteenth aspect, an apparatus is provided, and the apparatus includes a memory, a processor, a transceiver, a communications interface, and a bus system. The memory, the processor, the transceiver, and the communications interface are connected by using the bus system. The memory is configured to store an instruction. The processor is configured to execute the instruction stored in the memory. When the instruction is executed, the processor performs the method in the first aspect by using the communications interface, and controls the transceiver to receive entered data and entered information and to output data such as an operation result.

According to a fourteenth aspect, an apparatus is provided, and the apparatus includes a memory, a processor, a transceiver, a communications interface, and a bus system. The memory, the processor, the transceiver, and the communications interface are connected by using the bus system. The memory is configured to store an instruction. The processor is configured to execute the instruction stored in the memory. When the instruction is executed, the processor performs the method in the second aspect by using the communications interface, and controls the transceiver to receive entered data and entered information and to output data such as an operation result.

According to a fifteenth aspect, an apparatus is provided, and the apparatus includes a memory, a processor, a transceiver, a communications interface, and a bus system. The memory, the processor, the transceiver, and the communications interface are connected by using the bus system. The memory is configured to store an instruction. The processor is configured to execute the instruction stored in the memory. When the instruction is executed, the processor performs the method in the third aspect by using the communications interface, and controls the transceiver to receive entered data and entered information and to output data such as an operation result.

According to a sixteenth aspect, an apparatus is provided, and the apparatus includes a memory, a processor, a transceiver, a communications interface, and a bus system. The memory, the processor, the transceiver, and the communications interface are connected by using the bus system. The memory is configured to store an instruction. The processor is configured to execute the instruction stored in the memory. When the instruction is executed, the processor performs the method in the fourth aspect by using the communications interface, and controls the transceiver to receive entered data and entered information and to output data such as an operation result.

According to a seventeenth aspect, an apparatus is provided, and the apparatus includes a memory, a processor, a transceiver, a communications interface, and a bus system. The memory, the processor, the transceiver, and the communications interface are connected by using the bus system. The memory is configured to store an instruction. The processor is configured to execute the instruction stored in the memory. When the instruction is executed, the processor performs the method in the fifth aspect by using the communications interface, and controls the transceiver to receive entered data and entered information and to output data such as an operation result.

According to an eighteenth aspect, an apparatus is provided, and the apparatus includes a memory, a processor, a transceiver, a communications interface, and a bus system. The memory, the processor, the transceiver, and the communications interface are connected by using the bus system. The memory is configured to store an instruction. The processor is configured to execute the instruction stored in the memory. When the instruction is executed, the processor performs the method in the sixth aspect by using the communications interface, and controls the transceiver to receive entered data and entered information and to output data such as an operation result.

According to a nineteenth aspect, a computer storage medium is provided, configured to store a computer software instruction used in the method in the first aspect. The computer software instruction includes a program designed for performing the first aspect.

According to a twentieth aspect, a computer storage medium is provided, configured to store a computer software instruction used in the method in the second aspect. The computer software instruction includes a program designed for performing the second aspect.

According to a twenty-first aspect, a computer storage medium is provided, configured to store a computer software instruction used in the method in the third aspect. The computer software instruction includes a program designed for performing the third aspect.

According to a twenty-second aspect, a computer storage medium is provided, configured to store a computer software instruction used in the method in the fourth aspect. The computer software instruction includes a program designed for performing the fourth aspect.

According to a twenty-third aspect, a computer storage medium is provided, configured to store a computer software instruction used in the method in the fifth aspect. The computer software instruction includes a program designed for performing the fifth aspect.

According to a twenty-fourth aspect, a computer storage medium is provided, configured to store a computer software instruction used in the method in the sixth aspect. The computer software instruction includes a program designed for performing the sixth aspect.

In this application, names of a base station, user equipment, a PDCP entity, an RLC entity, and the like do not constitute a limitation on a device or an entity. During actual implementation, these devices or entities may appear in other names, provided that functions of the devices are similar to those in this application and fall within the scope of the claims of this application and their equivalent technologies.

These aspects or other aspects of this application are clearer and more comprehensible in descriptions of the following embodiments.

BRIEF DESCRIPTION OF DRAWINGS

FIG. 6 shows a PDCP header format for instructing a receive end to respond to an inquiry from a PDCP layer of a transmit end;

DESCRIPTION OF EMBODIMENTS

Figure 1:
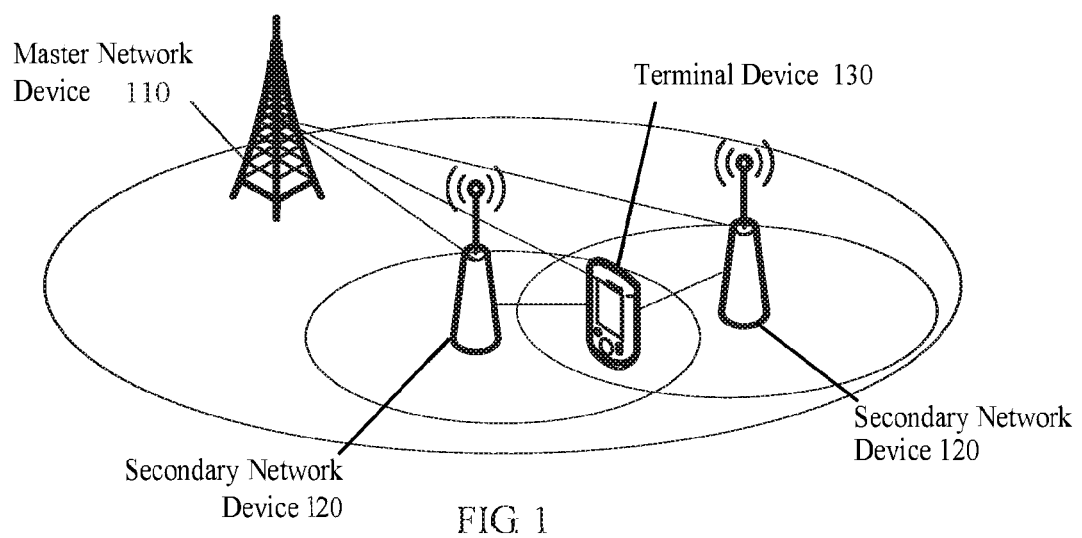
FIG. 1 is a schematic diagram of an application scenario according to this application.

The following clearly and completely describes the technical solutions in the embodiments of this application with reference to the accompanying drawings in the embodiments of this application.

It should be understood that the technical solutions in the embodiments of this application can be applied to various communications systems, such as a Global System for Mobile Communications (Global System for Mobile Communications, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an LTE frequency division duplex (Frequency Division Duplex, FDD) system, LTE time division duplex (Time Division Duplex, TDD), a Universal Mobile Telecommunications System (Universal Mobile Telecommunications System, UMTS), a Worldwide Interoperability for Microwave Access (Worldwide Interoperability for Microwave Access, WiMAX) communications system, or a future fifth generation mobile communications technology (5G) system.

Particularly, the technical solutions in the embodiments of this application can be applied to various communications systems that are based on a non-orthogonal multiple access technology, such as a sparse code multiple access (Sparse Code Multiple Access, SCMA) system and a low density signature (Low Density Signature, LDS) system. Certainly, the SCMA system and the LDS system may be referred to as other names in the communications field. Further, the technical solutions in the embodiments of this application can be applied to a multicarrier transmission system using the non-orthogonal multiple access technology, such as an orthogonal frequency division multiplexing (Orthogonal Frequency Division Multiplexing, OFDM) system using the non-orthogonal multiple access technology, a filter bank multicarrier (Filter Bank Multicarrier, FBMC) system, a generalized frequency division multiplexing (Generalized Frequency Division Multiplexing, GFDM) system, or a filtered orthogonal frequency division multiplexing (Filtered-OFDM, F-OFDM) system.

It should be further understood that in the embodiments of this application, a terminal device may be referred to as user equipment (User Equipment, UE), a terminal device, a mobile station (Mobile Station, MS), a mobile terminal (Mobile Terminal, MT), a terminal device in a future 5G network, or the like. The terminal device may communicate with one or more core networks by using a radio access network (Radio Access Network, RAN). For example, the terminal may be a mobile phone (or referred to as a "cellular" phone) or a computer that has a mobile terminal. For example, the terminal may be a portable, pocket-size, handheld, computer built-in or in-vehicle mobile apparatus, which exchanges voices and/or data with the radio access network.

A network device may be a base transceiver station (Base Transceiver Station, BTS) in Global System for Mobile Communications (Global System for Mobile Communications, GSM) or in Code Division Multiple Access (Code Division Multiple Access, CDMA), may be a NodeB (NodeB, NB) in Wideband Code Division Multiple Access (Wideband Code Division Multiple Access, WCDMA), may be an evolved NodeB (Evolved NodeB, eNB, or eNodeB) in LTE, or may be a relay node, an access point, an in-vehicle device, a wearable device, or an access network device in the future 5G network.

FIG. 1 is a schematic diagram of an application scenario according to this application. Network devices around a terminal device 130 include a master network device 110 and at least one secondary network device 120. The at least one secondary network device 120 is connected to the master network device 110 to form a multi-connection scenario. The at least one secondary network device 120 and the master network device 110 are both connected to the terminal device 130 to provide a service for the terminal device 130. The master network device 110 may be an LTE network, and the secondary network device 120 may be an NR network. Alternatively, the master network device 110 may be an NR network, and the secondary network device 120 may be an LTE network. Alternatively, both the master network device 110 and the secondary network device 120 are NR networks. An application scenario of this technical solution is not limited in this application. The terminal device 130 may simultaneously establish a connection to the master network device 110 and a connection to the secondary network device 120. The connection established between the terminal device 130 and the master network device 110 is a master connection, and the connection established between the terminal device 130 and the secondary network device 120 is a secondary connection. Control signaling of the terminal device 130 may be transmitted through the master connection. However, data of the terminal device may be transmitted through both the master connection and the secondary connection, or may be transmitted only through the secondary connection. In this embodiment of this application, the master network device 110 may select the secondary network device 120 meeting a preset condition, to transmit the data of the terminal device 130, so that load of the master network device 110 can be further reduced. For example, the preset condition may be that quality of a link between the secondary network device 120 and the terminal device 130 meets a data transmission condition.

In this embodiment of this application, the secondary network device 120 may be flexibly deployed based on a service requirement and user density. The secondary network device 120 may be used to assist the master network device 110 in offloading data. Secondary network devices 120 may be discontinuously deployed, and there may be a relatively large overlapping area between neighboring secondary cells. This is not limited in this embodiment of this application.

A bearer is a basic unit used to control a capacity, a latency, and a bit rate of a user service on a radio access network (Radio Access Network, RAN) side. One user may use a plurality of bearers to conduct different services.

In this embodiment of this application, a master base station may be, for example, a macrocell (Macrocell), and a secondary base station may be, for example, a microcell (Microcell), a picocell (Picocell), or a femtocell (Femtocell). However, this embodiment of this application is not limited thereto.

More specifically, the master base station may be an LTE base station, and the secondary base station is an NR base station. Alternatively, both the master base station and the secondary base station may be NR base stations. It should be understood that this embodiment of this application is not limited thereto. Alternatively, the master base station may be a GSM network device, a CDMA network device, or the like, and the secondary base station may be a GSM network device, a CDMA network device, or the like. This is not limited in this embodiment of this application.

For ease of understanding, some problems that may occur in a retransmission mechanism and a retransmission mechanism application in a multi-connection scenario are briefly described first with reference to FIG. 2 and FIG. 3, and an example of sending downlink data is used below for description.

In 5G NR currently discussed in 3GPP, an NR protocol stack combines and optimizes protocol functions based on an LTE protocol stack. If NR still uses an LTE protocol layer (Packet Data Convergence Protocol (Packet Data Convergence Protocol, PDCP)/Radio Link Control (Radio Link Control, RLC)/Medium Access Control (Medium Access Control, MAC)), a multi-connection protocol stack architecture is shown in FIG. 2. A PDCP entity of a master base station divides downlink data into a plurality of portions, and separately sends the plurality of portions to an RLC entity of the master base station and/or RLC entities of a plurality of secondary base stations. Each RLC entity receiving downlink data sends the downlink data to user equipment. Moreover, each RLC entity feeds back several pieces of information to the PDCP entity of the master base station in a downlink data transmission status process. The several pieces of information may include at least one of the following: a received highest PDCP sequence number acknowledged by the user equipment, a radio access bearer (E-UTRAN Radio Access Bearer, E-RAB), an amount of data that may continue to be sent by the PDCP entity of the master base station to the RLC entity through instruction, a packet loss situation of an interface between base stations, and the like. If there is uplink data, the uplink data may be further sent to the PDCP entity of the master base station together with a transmission status of the downlink data.

In a multi-connection use scenario, data is separately transmitted on different links. A PDCP layer is a data convergence layer, and can fully use radio resources of the master base station (Master evolved NodeB, MeNB) and the secondary base station (Secondary evolved NodeB, SeNB). This improves bandwidth that can be obtained by the user equipment (User Equipment, UE).

A protocol stack architecture is used as an example, and a retransmission action may occur at the following three layers.

(1) Hybrid Automatic Repeat Request (Hybrid Automatic Repeat Request, HARQ) Process at a MAC Layer of the MeNB/SeNB Retransmission at an utmost bottom layer is the HARQ process at the MAC layer, data is quickly recovered, and the HARQ process occurs on each MAC entity.

(2) Automatic Repeat Request (Automatic Repeat Request, ARQ) Process at an RLC Layer of the MeNB/SeNB An RLC acknowledged mode is required to be configured and used in a dual connection scenario. When a transmission error cannot be detected in the HARQ process at the MAC layer, processing is performed by using the ARQ process at the RLC layer. There is an RLC entity at each RLC layer. When meeting a specified condition, an RLC entity on a network side inquires of an RLC entity on a user equipment side about whether the RLC entity on the user equipment side correctly receives data. The RLC entity on the user equipment side sends response information to the RLC entity on the network side, to indicate a data reception success situation and a data reception failure situation. As shown in FIG. 2, when downlink data is transmitted on the network side, a core network device sends the to-be-transmitted downlink data to the master base station. The PDCP entity of the master base station may allocate nine PDCP protocol data units (Protocol Data Unit, PDU) in the downlink data to a secondary base station 1, a secondary base station 2, and the master base station, so that the secondary base station 1, the secondary base station 2, and the master base station separately transmit the PDCP protocol data units to the user equipment. As shown in FIG. 2, PDCP PDUs with sequence numbers 1 to 3 may be allocated to the RLC entity of the master base station, PDCP PDUs with sequence numbers 4 to 6 may be allocated to an RLC entity of the secondary base station 1, and PDCP PDUs with sequence numbers 7 to 9 may be allocated to an RLC entity of the secondary base station 2. When each RLC entity on the network side completes sending of data to each RLC entity of the user equipment, each RLC entity on the network side inquires whether the RLC entity of the user equipment correctly receives the corresponding data, and each RLC entity of the user equipment responds to a corresponding RLC entity on the network side according to a received inquiry.

(3) Data Recovery at a PDCP Layer of the MeNB/SeNB

In some scenarios, a protocol stack at a bottom layer cannot acknowledge or retransmit data due to reconstruction and the like. Therefore, a PDCP entity performs a data recovery action. In a single connection scenario, to implement hitless switch, after performing switch, the PDCP entity retransmits a PDCP PDU whose successful transmission is not acknowledged by the RLC entity. This type of retransmission action is also supported in the dual connection scenario. In the dual connection scenario, a data recovery action of the PDCP entity is newly added. When a secondary cell group (Secondary cell group, SCG) is released/changed, the user equipment retransmits data that is not acknowledged by a re-constructed RLC entity, and sends and directly notifies a transmission status of each RLC entity to the PDCP entity of the master base station. The PDCP entity of the master base station retransmits data that is lost due to path switch.

Even though the retransmission mechanism may be used in the multi-connection scenario, 5G NR has some features different from those of LTE as the communications system continuously evolves. For example, high frequency may be commonly used in 5G NR, a high-frequency signal is easily affected by an obstacle, and an unstable phenomenon that quality of a link suddenly degrades or the like may occur. Therefore, directly applying the retransmission mechanism to a 5G NR multi-connection scenario may cause the following problems.

1. Reordering Latency of a Receive End

A PDCP entity of a transmit end corresponds to a plurality of RLC entities, and a characteristic of an RLC entity is that the RLC entity has retransmission and reordering functions, but data from RLC entities on different links may be out of order. Therefore, the receive end needs to use a reordering function. FIG. 3 is used as an example for description. A PDCP entity of UE separately receives data from three RLC entities of the MeNB, the SeNB 1, and the SeNB 2. If quality of a link on the SeNB 2 suddenly degrades at a moment t1, data is acknowledged only after an RLC entity on the link repeatedly retransmits the data. Alternatively, data is not acknowledged even throughout but a maximum quantity of retransmission times of the RLC reaches. Finally, an SCG is released at a moment t2. In this way, the receive end performs a PDCP data recovery process and sends a PDCP status report, and the PDCP entity of the MeNB retransmits, according to the PDCP status report, data that fails to be correctly received. However, different from the link on which the problem occurs and that is on the SeNB 2, other links all work normally. Repeated retransmission for the SeNB 2 and data recovery may cause data correctly transmitted on another link to fail to be sent to an upper layer in time, and a reordering process is not completed until a moment t3. This causes a relatively large reordering latency, and exerts severe impact on an application having a real-time requirement.

2. Redundancy of an RLC Status Report on Each Link

Retransmission at the RLC layer depends on an inquiry and a status report feedback. A transmitter sends an inquiry request under a specified condition. A receiver responds to the inquiry request, and feeds back the RLC status report. The condition for sending the inquiry includes: a quantity of sent PDUs is greater than a preset threshold, a quantity of sent bytes is greater than a preset threshold, both a transmission buffer and a retransmission buffer are empty, no new data can be transmitted, and the like.

It can be learned that the RLC entity generates the inquiry and the RLC status report regardless of whether data is lost and whether retransmission needs to be performed. However, for the multi-connection scenario, there is an RLC entity on each link. Therefore, separately generating the inquiry and the RLC status report on a plurality of links is a relatively redundant manner. As shown in FIG. 2, at the PDCP layer, data is divided into several portions, and the several portions are separately transmitted on the MeNB and the plurality of SeNBs. To acknowledge a segment of data that may be all correctly received, data packets of a plurality of RLC inquiries and status reports need to be generated on a plurality of links. This wastes air interface resources. Use of a higher-layer inquiry and higher-layer retransmission may be considered. That is, the PDCP entity performs an inquiry and retransmission, to omit a status report on each link.

In view of the foregoing problems that may occur when the retransmission mechanism is applied to the multi-connection scenario, this application provides a new retransmission mechanism, and the new retransmission mechanism is mainly applied to an NR multi-connection scenario in a future 5G network. However, this application is not limited thereto. As shown in FIG. 1, the master network device and the secondary network device may be respectively a macrocell having relatively large coverage and a small cell supplementing the coverage that are in an NR system. The UE is in an overlapping area covered by a plurality of base stations, and may use resources of the plurality of base stations. For ease of description, the NR multi-connection scenario is used as an example in this application. However, this application is not limited thereto. For example, the macrocell and the small cell may be LTE base stations.

It should be understood that the terms "system" and "network" in this specification may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

Various retransmission processing methods provided in the embodiments of this application are separately described below with reference to FIG. 4 to FIG. 7. A method for performing retransmission processing on downlink data is described first.

Figure 4:
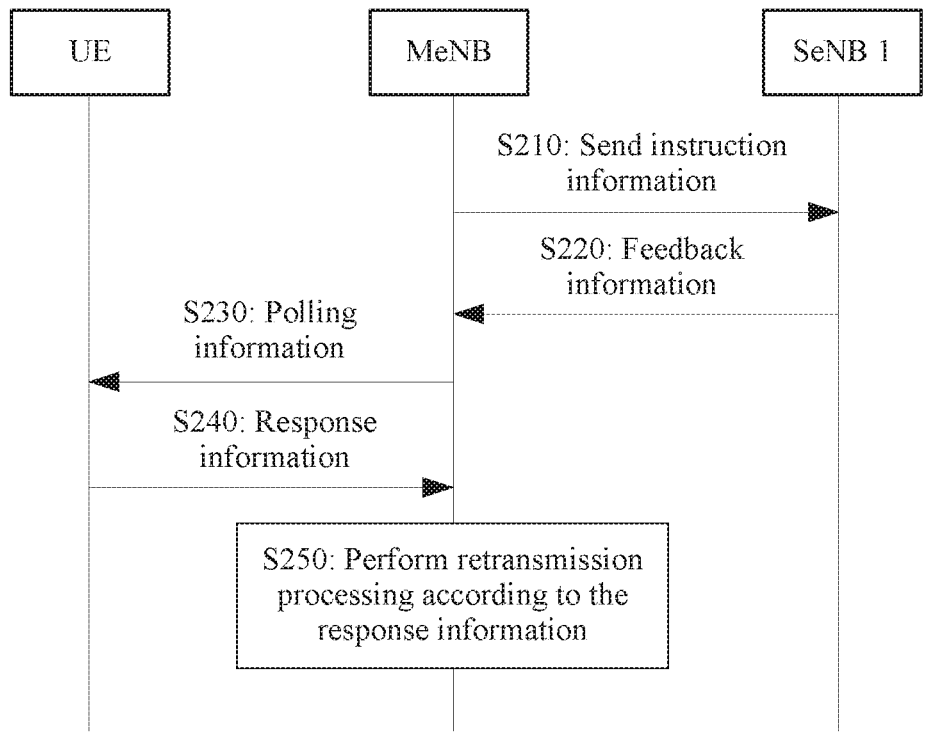
FIG. 4 is a schematic block diagram of a retransmission processing method according to an embodiment of this application.

FIG. 4 is a schematic block diagram of a retransmission processing method 200 according to an embodiment of this application. The method 200 in FIG. 4 can be applied to the multi-connection scenario shown in FIG. 1. A master base station in the method 200 is the master network device described above, a secondary base station is the secondary network device described above, and user equipment is the terminal device described above. As shown in FIG. 4, the method 200 includes the following steps:

S210: A master base station sends instruction information to a first secondary base station. The instruction information is used to instruct the first secondary base station to send feedback information to the master base station after sending data to user equipment. The first secondary base station receives the feedback information sent by the master base station.

S220: After sending the data to the user equipment, the first secondary base station sends the feedback information to the master base station according to the instruction information sent by the master base station. The master base station receives the feedback information sent by the first secondary base station.

S230: The master base station sends inquiry information to the user equipment according to the received feedback information, and the master base station inquires of the user equipment about whether the user equipment correctly receives the data sent by the first secondary base station. The user equipment receives the inquiry information sent by the master base station.

S240: The user equipment sends response information for the inquiry information to the master base station. The master base station receives the response information that is sent by the user equipment and that is for the inquiry information.

S250: The master base station performs retransmission processing on the data according to the response information that is sent by the user equipment and that is for the inquiry information.

Optionally, retransmission processing may include the following cases: When the master base station estimates, according to the feedback information, that the data sent by the first secondary base station is successfully transmitted, the master base station may not retransmit the data sent by the first secondary base station; when the master base station estimates, according to the feedback information, that the data sent by the first secondary base station is unsuccessfully transmitted, the master base station may determine that the data sent by the first secondary base station needs to be retransmitted, so that the master base station can select a specific secondary base station to retransmit the unsuccessfully transmitted data.

It should be understood that there may be one or more first secondary base stations. This is not limited in this application.

Optionally, the data sent by the first secondary base station may be all or some of data allocated by the master base station. This is not limited in this application.

To fully use multi-connection flexibility, and to enable the master base station to be capable of mastering a transmission status of each link in time, a PDCP entity of the master base station is configured to perform retransmission processing, and an RLC entity on each link immediately sends a feedback to the PDCP entity of the master base station after sending data, so that the PDCP entity of the master base station can fully use multi-link flexibility to select a more reliable link for retransmission. This avoids a relatively large reordering latency that is in receiving the data by the user equipment and that is caused by continuous use of a link with relatively poor quality.

A retransmission processing method 300 in an embodiment of this application is described below in detail with reference to a procedure in FIG. 5. Details are as follows:

S301: First configure, according to the Radio Resource Control (Radio Resource Control, RRC) protocol, a PDCP layer of a master base station to use an ARQ.

S302: The master base station may send instruction information to a secondary base station 1 and/or a secondary base station 2. The secondary base station 1 and/or the secondary base station 2 receive/receives the instruction information.

S303: After sending data to user equipment, the secondary base station 1 and/or the secondary base station 2 send/sends feedback information to the master base station according to the instruction information sent by the master base station. Similarly, the master base station receives the feedback information sent by the secondary base station 1 and/or the secondary base station 2.

S304: The master base station sends inquiry information to the user equipment according to the feedback information sent by the secondary base station 1 and/or the secondary base station 2, where the inquiry information is used to inquire whether the user equipment correctly receives the data sent by the secondary base station 1 and/or the secondary base station 2. Similarly, the user equipment receives the inquiry information sent by the master base station.

S305: The master base station may send, to the user equipment, information indicating a path for sending inquiry response information, and the user equipment may receive the information indicating the path for sending the inquiry response information.

S306: The user equipment may send response information for the inquiry information to the master base station, and the master base station receives the response information.

S307: After receiving the response information sent by the user equipment, the master base station finds that the data sent by the secondary base station 1 is not correctly received by the user equipment, and needs to be retransmitted. The lost data may be retransmitted by using solutions in step S308 and step S309.

S308: If an amount of lost data is relatively large, it indicates that a link fault may occur on the secondary base station 1 transmitting the lost data, and the secondary base station 1 is no longer suitable for performing retransmission. In this case, the master base station may send the retransmitted data as new data to the secondary base station 2, and the secondary base station 2 transmits the new data. The secondary base station 2 receives the data that is sent by the master base station and that is lost by the secondary base station 1, and transmits the data lost by the secondary base station 1 to the user equipment.

S309: The master base station instructs the secondary base station 1 to retransmit data in a buffer. After receiving a notification message, the secondary base station 1 resends the lost data to the user equipment.

Specifically, to configure, according to the RRC protocol, whether a PDCP entity of the master base station uses the ARQ, a parameter ARQ Enableflag may be added to the PDCP entity of the master base station. When the value is set to 1, the PDCP entity uses the ARQ. When the value is set to 0, the PDCP entity does not use the ARQ like a conventional LTE PDCP entity. Alternatively, an RLC entity of the master base station may be instructed to immediately send the feedback information to the PDCP entity of the master base station after sending the data to the user equipment. It should be understood that in this embodiment of this application, the PDCP entity of the master base station may allocate to-be-sent downlink data to at least one link based on an amount of data. One link herein corresponds to one RLC sending entity, and may be the RLC entity of the master base station, or may be an RLC entity of a secondary base station.

The secondary base station 1 and/or the secondary base station 2 may further receive the instruction information sent by the master base station, to implement protocol stack configuration. For example, the secondary base station 1 and the secondary base station 2 may be configured each time after completing sending of some or all of the data allocated by the master base station. The secondary base station 1 and/or the secondary base station 2 may be further configured to send a feedback to the master base station once each time after completing sending of n PDCP PDUs. To be specific, the secondary base station 1 and/or the secondary base station 2 are/is configured to trigger a feedback under a specified condition, and notify/notifies a data sending status to the master base station by using a data plane of an interface between base stations, so that the master base station determines an inquiry and retransmission occasion. Optionally, an inquiry may be polling. The RLC entity of the master base station may be also configured to send a feedback to the PDCP entity of the master base station after completing sending of the data. For example, the instruction information is used to instruct the secondary base station 1 and/or the secondary base station 2 to send the feedback information to the master base station after sending 50% of the data allocated by the master base station. The instruction information may be further used to instruct the secondary base station 1 and/or the secondary base station 2 to send the feedback information to the master base station after sending one PDU. The feedback information may be a sequence number of the data whose sending is completed by the secondary base station 1 or the secondary base station 2 in this case. The master base station may simultaneously receive the feedback information sent by the secondary base station 1 and the secondary base station 2, or may sequentially receive the feedback information sent by the secondary base station 1 and the secondary base station 2. A receiving order is not limited.

It should be understood that the instruction information sent by the master base station to the secondary base station 1 and/or the secondary base station 2 may be carried in an addition request message/modification request message, to newly create and reconfigure a data radio bearer (data radio bearer, DRB). Alternatively, the instruction information may be carried in another existing message. A message in which the instruction information is carried is not limited in this application, provided that any message that can be sent by the master base station to the secondary base station can be used to carry the instruction information. The instruction information is carried by using the existing message, and the master base station can reconfigure the secondary base station without a need to add a new resource, so that an unnecessary resource waste is avoided. In addition, the feedback information sent by the secondary base station 1 and/or the secondary base station 2 to the master base station may also be carried in the existing message, for example, the feedback information is carried in a transmission status of downlink data.

Optionally, in an embodiment of this application, the instruction information is further used to instruct the secondary base station 1 and/or the secondary base station 2 not to perform retransmission processing. In other words, the instruction information is further used to instruct the secondary base station 1 and/or the secondary base station 2 not to use the ARQ.

The secondary base station is configured not to perform retransmission processing, and the master base station may inquire of the user equipment about transmission statuses of a plurality of secondary base stations once. This avoids an air interface resource waste caused by interaction between each secondary base station and the user equipment.

A core network device or another network device may further configure the secondary base station in this embodiment of this application. This is not limited in this application.

It should be noted that receiving and sending the feedback information herein may be direct actions between the master base station and the secondary base station. Alternatively, the feedback information may be generated by the secondary base station, but is transmitted from the secondary base station to the master base station in a specified manner, and the master base station then receives the feedback information and uses the feedback information. In other words, receiving and sending the feedback information in this embodiment of this application are not limited to direct receiving and direct sending.

Optionally, the master base station may directly perform retransmission processing according to the feedback information. For example, the master base station may set a time window. If the master base station does not receive the feedback information from the first secondary base station within the time window, or receives the feedback information outside the time window, the master base station may estimate that a link for transmitting the data is relatively congested. Therefore, the master base station may instruct another secondary base station to retransmit the portion of data sent by the first secondary base station.

Figure 6:
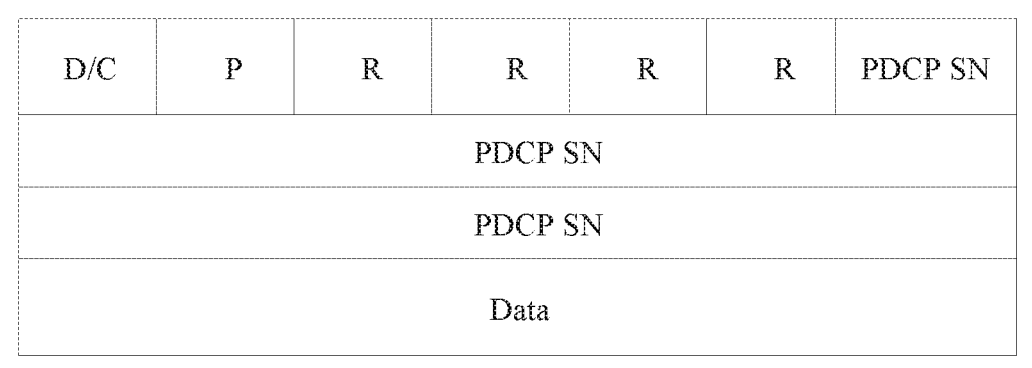

Optionally, in this embodiment of this application, the master base station may send the inquiry information to the user equipment according to the feedback information, and may inquire of the user equipment about whether the user equipment correctly receives the data sent by the secondary base station 1 and the secondary base station 2. Alternatively, after first receiving the feedback information sent by the secondary base station 1 or the secondary base station 2, the master base station may directly inquire of the user equipment about whether the user equipment correctly receives the data sent by the secondary base station 1 or the secondary base station 2. Usually, the user equipment does not respond to a PDCP inquiry of the master base station. In this embodiment of this application, an inquiry bit may be set in a PDCP header using an 18-bit sequence number, to indicate, to the master base station, whether the user equipment needs to respond to the inquiry information. If the bit is set to 1, it indicates that the user equipment needs to respond to the inquiry information. Other indication information used to indicate that the user equipment needs to respond to the inquiry information may be added to the PDCP header. FIG. 6 shows a format of a PDCP PDU. D/C is identified as a control PDU or a data PDU, a bit P may be a bit in a first byte, R is a reserved bit, a PDCP SN is a sequence number of sent PDCP data, and data indicates uncompressed PDCP input data/compressed PDCP input data. If the bit P is 1, it indicates that the user equipment needs to feed back a PDCP status report. Other indication information used to indicate that the user equipment needs to respond to the inquiry information may be added to the PDCP header. For example, a bit R in another format may be set as the bit P to implement a response of the user equipment to the PDCP inquiry of the master base station.

Optionally, the master base station may inquire of the user equipment about whether the data sent by the master base station to the user equipment is correctly received. In an embodiment, the master base station inquires of the user equipment about sending statuses of a plurality of base stations once. However, the user equipment may provide the sending statuses of the plurality of base stations in the response information.

Optionally, in an embodiment of this application, the master base station may add a new information element to PDCP configuration information content of an RRC connection reconfiguration message. If the information element is 1, it indicates that the master base station configures a static inquiry information feedback path for the user equipment to the master base station. Specifically, the master base station may instruct the user equipment to send the response information for the inquiry information to the master base station by using the secondary base station 1. In other words, provided that the master base station no longer instructs the user equipment, the user equipment sends the response information for the inquiry information to the master base station by using the secondary base station 1 by default. If the newly added information element is set to 0, no default response information feedback path is configured for the user equipment, and the user equipment sends the response information for the inquiry information on a path for receiving, each time, the inquiry information sent by the master base station. In this way, the master base station may select a relatively reliable link, to initiate an inquiry to the user equipment. In this manner, the user equipment may be guided to send the response information for the inquiry information on the relatively stable link, to avoid a problem that the response information for the inquiry information is lost. For example, if the master base station determines that the secondary base station 1 is relatively stable, the master base station may send the inquiry information to the user equipment by using the secondary base station 1. In this case, the user equipment may also send the response information for the inquiry information to the master base station by using the secondary base station 1.

It should be understood that the response information for the inquiry information may be transmission statuses of a plurality of secondary base stations, for example, transmission statuses of the secondary base station 1 and the secondary base station 2. The master base station may learn of the transmission statuses of the secondary base station 1 and the secondary base station 2, and therefore whether the data needs to be resent may be determined. The response information that is received by the master base station and that is for the inquiry information may further include a transmission status of the master base station.

Optionally, in this embodiment of this application, after the master base station determines that the data transmitted by the secondary base station 1 is lost, the master base station sends the lost data to the secondary base station 2, to instruct the secondary base station 2 to resend the lost data to the user equipment. After receiving the data that is sent by the master base station and that is lost by the secondary base station 1, the secondary base station 2 sends the lost data as new data to the user equipment. This retransmission manner is suitable when quality of a secondary base station that originally transmits data is relatively poor. When the master base station determines that data on the secondary base station 1 may be lost, the master base station instructs the secondary base station 1 to retransmit the data in the buffer. After receiving the notification message, the secondary base station 1 resends the lost data to the user equipment. The method is suitable for a loss of individual data instead of a data loss caused by an unstable link even time validity.

In this embodiment of this application, after sending data, each secondary base station may not send the feedback information to the master base station, that is, each secondary base station may not provide assistance information. The master base station may independently determine when to send the inquiry information to the user equipment, and determine, after receiving the response information that is sent by the user equipment and that is for the inquiry information, whether the data needs to be retransmitted. In this embodiment of this application, information about a status of a link may be fed back in another manner. For example, the secondary base station may notify, by using a parameter, the master base station that the current status of the link is undesirable. After receiving information for feeding back undesirable quality of the link, the master base station may attempt to place, on another link for retransmission, the data on the link. Specifically, the secondary base station may determine the status of the link by using a mechanism for fully learning of the quality of the current link, without considering a current sending status. For example, a parameter SeNB_link_degradation is set. When the status of the link is undesirable, the parameter is set to 1, and the parameter is fed back to the master base station. When the master base station receives the parameter from a secondary base station, it indicates that there is a relatively high possibility that data on the secondary base station is lost. Therefore, the master base station may allocate, to another secondary base station for resending, data originally allocated to the secondary base station for sending. Alternatively, when the status of the link is undesirable, the parameter SeNB_link_degradation may be set to 0. A specific value of the parameter indicating undesirable quality of the link is not limited in this application.

Optionally, in this embodiment of this application, that the master base station sends inquiry information to the user equipment according to the feedback information includes: the master base station sends the inquiry information to the user equipment according to the feedback information and a status of a transmit window of the first secondary base station.

Specifically, the master base station receives the feedback information, and may determine the status of the transmit window of the secondary base station in this case. If the transmit window is not blocked, the master base station may not send the inquiry information to the user equipment; or if the transmit window is blocked in this case, the master base station may send the inquiry information to the user equipment. The master base station may further maintain a transmit window by using a sliding window mechanism. Regardless of whether a plurality of secondary base stations complete sending of data, the user equipment is inquired of only according to a status of the transmit window, for example, the transmit window cannot slide backwards or the sent data is half of the size of the window. Alternatively, when a sending buffer of the secondary base station is empty, one piece of instruction information is fed back to the user equipment, and the user equipment can send the response information for the inquiry information to the master base station without a need to send the inquiry information to the user equipment by the master base station. Alternatively, the master base station may send the inquiry information to the user equipment in another trigger condition. This is not limited in this application.

Figure 5:
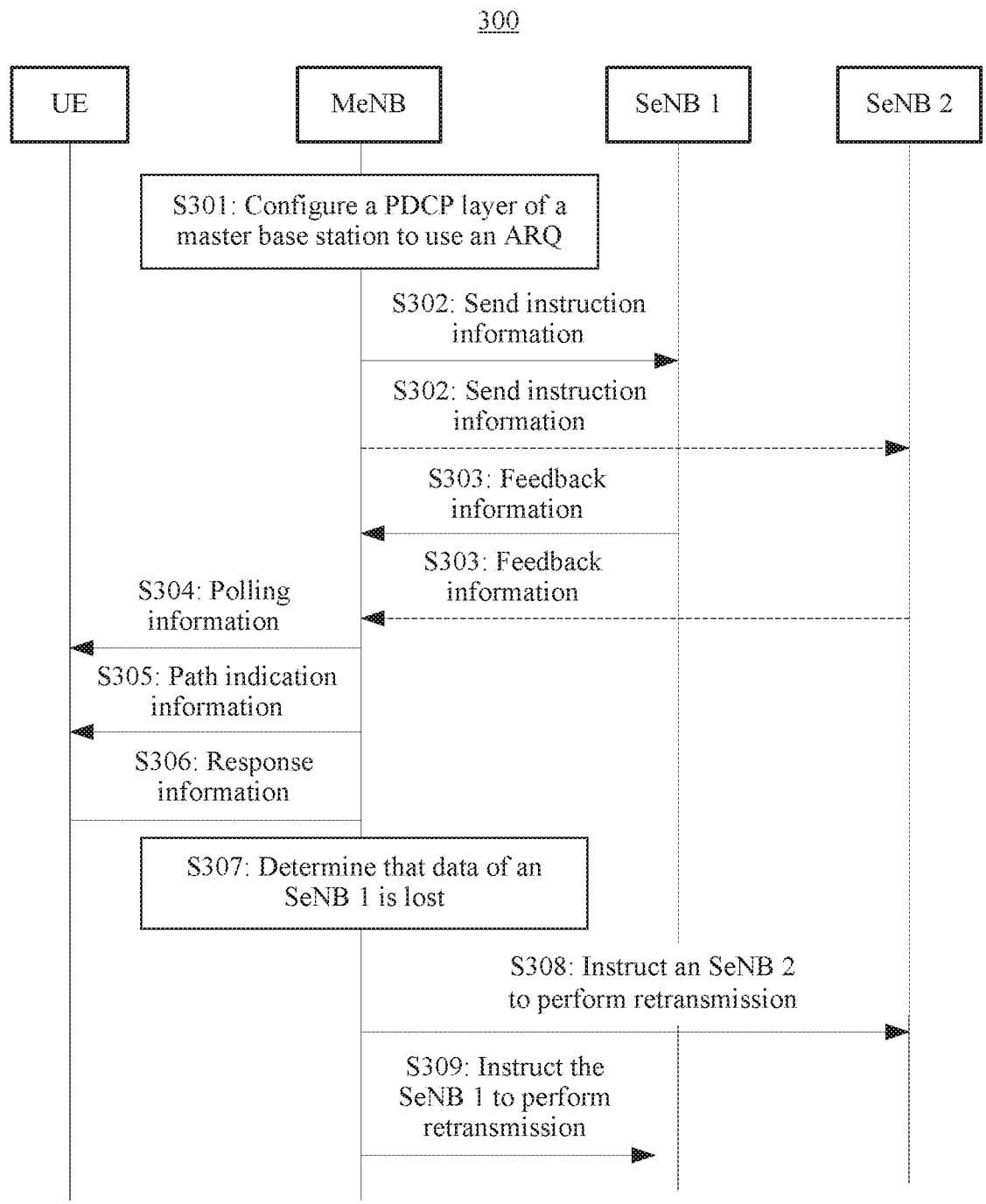
FIG. 5 is a schematic flowchart of a retransmission processing method according to an embodiment of this application.

It should be understood that FIG. 5 shows detailed steps or operations of the retransmission processing method. However, these steps or operations are merely examples. Another operation or a variant of each operation in FIG. 5 may also be performed in this embodiment of this application. In addition, the steps in FIG. 5 may be performed in an order different from that shown in FIG. 5, and not all the operations in FIG. 5 may be performed.

It should be further understood that sequence numbers of the foregoing processes do not mean execution orders in the embodiments of this application. The execution orders of the processes should be determined based on functions and internal logic of the processes, and should not be construed as any limitation on the implementation processes of the embodiments of this application.

Therefore, according to the retransmission processing method in this embodiment of this application, retransmission processing is performed by the PDCP entity of the master base station. This improves flexibility of selecting a retransmission link. The PDCP entity of the master base station may estimate, in time based on sending statuses of a plurality of links, a data loss caused by degradation of quality of a link, and quickly initiate retransmission on another link, to shorten a reordering latency of a PDCP entity of the user equipment. In addition, the RLC entity does not use the ARQ. Inquiry information sent by the RLC entity to the user equipment on the plurality of links and a plurality of RLC status reports sent by the user equipment are replaced with one piece of response information used to respond to the PDCP entity of the master base station. The response information is used to indicate whether the data is correctly received. In a retransmission mechanism of the PDCP entity, a specific link for transmitting the data is not emphasized, but a current receiving status of the user equipment is inquired from an overall perspective. The user equipment can respond to the inquiry information sent by the PDCP entity of the master base station, and can select, under the guidance of a network, a path to send the response information for the inquiry information, so that the response information for the inquiry information is transmitted on a link with relatively desirable quality. This fully uses multi-connection flexibility.

The retransmission processing method in this embodiment of this application is described above in detail by using an example in which downlink data is sent from a network side to a user equipment side. A retransmission processing method in an embodiment of this application is described below by using an example in which uplink data is sent from a user equipment side to a network side.

A retransmission processing method 500 in an embodiment of this application is described below in detail with reference to a procedure in FIG. 7. Details are as follows:

S501: A PDCP entity of user equipment receives first instruction information sent by a master base station, where the first instruction information instructs a PDCP layer of the user equipment to use an ARQ function. The PDCP entity of the user equipment receives the first instruction information, and configures the PDCP entity of the user equipment.

S502: RLC 1 and/or RLC 2 of the user equipment separately receive/receives second instruction information sent by the master base station, where the second instruction information instructs the RLC 1 and/or the RLC 2 of the user equipment to send feedback information to the PDCP entity of the user equipment after sending data to a network side.

S503: The RLC 1 and/or the RLC 2 of the user equipment respectively send/sends uplink data 1 and uplink data 2 to a secondary base station 1 and/or a secondary base station 2. The secondary base station 1 and/or the secondary base station 2 respectively receive/receives the uplink data 1 and the uplink data 2 sent by the RLC 1 and/or the RLC 2 of the user equipment.

S504: The secondary base station 1 and/or the secondary base station 2 respectively send/sends the received uplink data 1 and the received uplink data 2 to the master base station. The master base station separately receives the uplink data 1 and the uplink data 2 by using an interface between base stations.

S505: After sending the uplink data 1 and the uplink data 2 to the network side, the RLC 1 and/or the RLC 2 of the user equipment send/sends the feedback information to the PDCP entity of the user equipment. Similarly, the PDCP entity of the user equipment receives the feedback information sent by the RLC 1 and/or the RLC 2.

S506: The PDCP layer of the user equipment sends inquiry information to the master base station according to the feedback information sent by the RLC 1 and/or the RLC 2 of the user equipment. Similarly, the master base station receives the inquiry information sent by the PDCP layer of the user equipment.

S507: The master base station may send response information for the inquiry information to the PDCP layer of the user equipment, and the master base station receives the response information.

S508: After receiving the response information sent by the master base station, the PDCP layer of the user equipment determines that the data sent by the RLC 1 is not correctly received by the master base station, and needs to be retransmitted. The lost data may be retransmitted by using solutions in step S509 and step S510.

S509: If an amount of lost data is relatively large, it indicates that a link fault may occur on the RLC 1 transmitting the lost data, and the RLC 1 is no longer suitable for performing retransmission. In this case, the PDCP entity of the user equipment may send the retransmitted data as new data to the RLC 2, and the RLC 2 transmits the new data.

S510: The PDCP entity of the user equipment instructs the RLC 1 to retransmit data in a buffer. After receiving a notification message, the RLC 1 resends the lost data to the master base station.

It should be understood that there may be one or more first RLC entities. This is not limited in this application.

Optionally, the data sent by the first RLC entity of the user equipment may be all or some of data allocated by the PDCP entity of the user equipment. This is not limited in this application.

Optionally, the first instruction information may be configuration information. That is, the master base station configures the PDCP entity of the user equipment to use the ARQ. Specifically, a parameter that needs to be changed may be notified to the user equipment, and the user equipment changes a mode for the PDCP entity according to an indication of the master base station. A specific procedure in which the PDCP entity of the user equipment is configured to use the ARQ is similar to the procedure in which a PDCP entity of the master base station is configured to use the ARQ in the method 300. For brevity, details are not described herein again.

After the RLC 1 and/or the RLC 2 of the user equipment receive/receives the second instruction information, the RLC 1 and/or the RLC 2 of the user equipment are/is configured. Specifically, the RLC 1 and/or the RLC 2 may be configured each time after completing sending of some or all of the data allocated by PDCP layer of the user equipment. The RLC 1 and/or the RLC 2 may be further configured to send a feedback to the PDCP entity of the user equipment once each time after completing sending of n PDCP PDUs. To be specific, the RLC 1 and/or the RLC 2 are/is configured to trigger a feedback under a specified condition, and notify/notifies a data sending status to the PDCP entity of the user equipment, so that the PDCP entity of the user equipment determines an inquiry and retransmission occasion.

Optionally, in an embodiment of this application, the instruction information sent by the master base station to the user equipment may be carried in an RRC connection reconfiguration message, to newly create and reconfigure a data radio bearer (data radio bearer, DRB). Alternatively, the instruction information may be carried in another existing message. A message in which the instruction information is carried is not limited in this application, provided that any message that can be sent by the master base station to the user equipment can be used to carry the instruction information. The instruction information is carried by using the existing message, and the master base station can reconfigure the secondary base station without a need to add a new resource, so that an unnecessary resource waste is avoided.

Optionally, in an embodiment of this application, the instruction information is further used to instruct the RLC 1 and the RLC 2 not to use the ARQ function. The RLC entity of the user equipment is configured not to use the ARQ function, and the PDCP entity of the user equipment may inquire of the master base station about transmission statuses of a plurality of RLC entities once. This avoids an air interface resource waste caused by interaction between each RLC entity and the master base station.

A core network device or another network device may further configure the user equipment in this embodiment of this application. This is not limited in this application.

Figure 2:
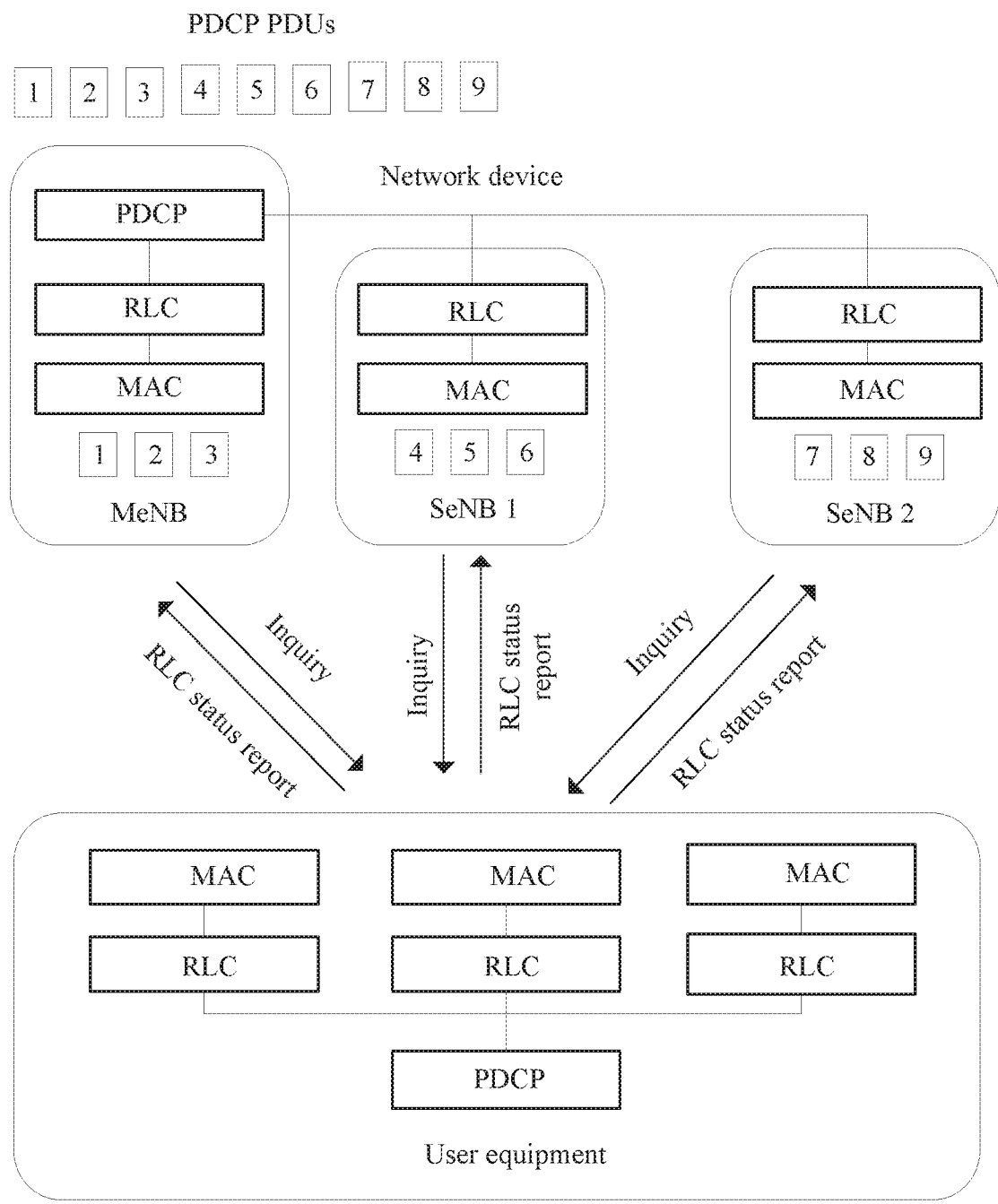
FIG. 2 is a schematic block diagram of a protocol stack architecture in a multi-connection scenario.
Figure 3:
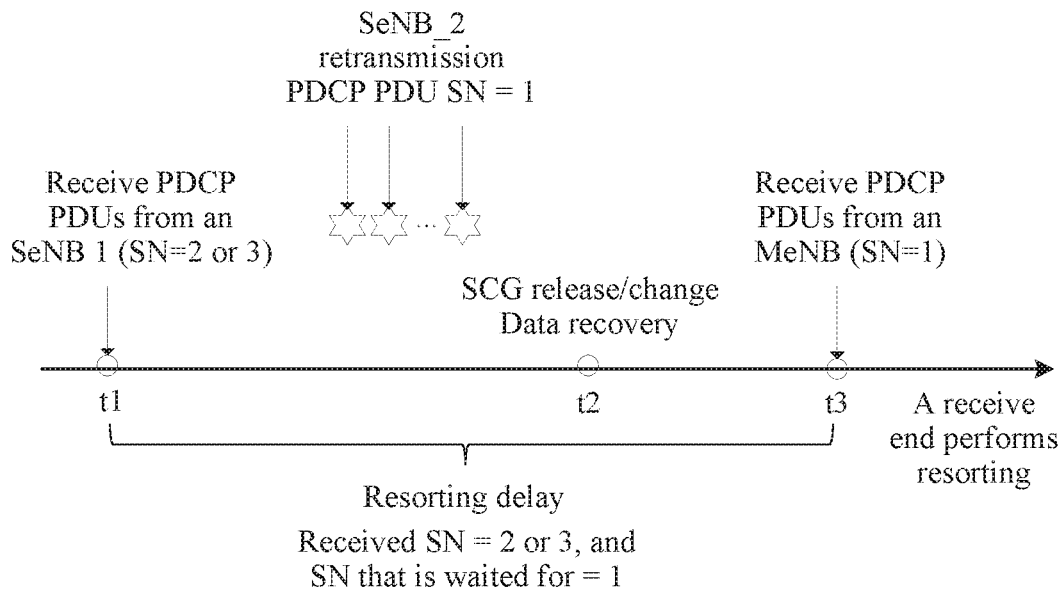
FIG. 3 is a schematic diagram of a prior-art problem of a relatively large reordering latency at a receive end.

A person skilled in the art understands that in a multi-connection scenario, as shown in FIG. 2, an RLC entity of a transmit end and an RLC entity of a receive end are on each link. That is, when sending uplink data, the RLC entity of the user equipment directly sends the data to each RLC entity on the network side. Each RLC entity may be an RLC entity of the master base station or an RLC entity of the secondary base station. For ease of description, the RLC 1 of the user equipment herein corresponds to the secondary base station 1, and the RLC 2 of the user equipment corresponds to the secondary base station 2.

It should be noted that receiving and sending the feedback information herein may be direct actions between the PDCP entity of the user equipment and the RLC entity of the user equipment. Alternatively, the feedback information may be generated by the RLC entity of the user equipment, but is transmitted from the RLC entity to the PDCP entity in a specified manner, and the PDCP entity then receives the feedback information and uses the feedback information. In other words, receiving and sending the feedback information in this embodiment of this application are not limited to direct receiving and direct sending.

Optionally, in this embodiment of this application, the PDCP entity of the user equipment may send the inquiry information to the master base station according to the feedback information. After receiving the feedback information sent by the RLC 1 and/or the RLC 2 of the user equipment, the PDCP entity of the user equipment may directly inquire of the user equipment about whether the master base station correctly receives the data sent by the RLC 1 and/or the RLC 2 of the user equipment. The master base station may send the response information for the inquiry information to the PDCP entity of the user equipment. The response information may be transmission statuses of a plurality of RLC entities of the user equipment, for example, transmission statuses of the RLC 1 and the RLC 2. The PDCP entity of the user equipment may learn of the transmission statuses of the RLC 1 and the RLC 2, and therefore whether the data needs to be resent may be determined.

It should be understood that a process in which the PDCP entity of the user equipment inquires of the master base station when sending uplink data is similar to a process in which the PDCP entity of the master base station inquires of the user equipment when sending downlink data. For a specific procedure, refer to step S304 and step S305 in the method 300. Details are not described herein again.

Optionally, in an embodiment, after the master base station determines that the data transmitted by the RLC 1 is lost, the PDCP entity of the user equipment sends the lost data to the RLC 2, and instructs the RLC 2 to resend the lost data to the master base station. After receiving the data that is sent by the PDCP entity of the user equipment and that is lost by the RLC 1, the RLC 2 sends the lost data as new data to the master base station. This retransmission manner is suitable when quality of RLC that originally transmits data is relatively poor. In another embodiment, when the PDCP entity of the user equipment determines that the data on the RLC 1 may be lost, the PDCP entity of the user equipment instructs the RLC 1 to retransmit the data in the buffer. After receiving the notification message, the RLC 1 resends the lost data to the master base station. The method is suitable for a loss of individual data instead of a data loss caused by an unstable link even time validity.

In this embodiment of this application, after sending data, each RLC entity may not send the feedback information to the PDCP entity of the user equipment, that is, each RLC entity may not provide assistance information. The PDCP entity of the user equipment may independently determine when to send the inquiry information to the master base station, and determine, after receiving the response information that is sent by the master base station and that is for the inquiry information, whether the data needs to be retransmitted. In this embodiment of this application, information about a status of a link may be fed back in another manner. For example, the RLC entity may notify, by using a parameter, the master base station that the current status of the link is undesirable. After receiving information for feeding back undesirable quality of the link, the PDCP entity of the user equipment may attempt to place, on another link for retransmission, the data on the link.

Optionally, in this embodiment of this application, that the PDCP entity of the user equipment sends inquiry information to the master base station according to the feedback information includes: the PDCP entity of the user equipment sends the inquiry information to the master base station according to the feedback information and a status of a transmit window of the first RLC entity.

Specifically, after receiving the feedback information, the PDCP entity of the user equipment may determine the status of the transmit window of the RLC entity of the user equipment in this case. If the transmit window is not blocked, the PDCP entity of the user equipment may not send the inquiry information to the master base station; or if the transmit window is blocked in this case, the PDCP entity of the user equipment may send the inquiry information to the master base station. The PDCP entity of the user equipment may further maintain a transmit window by using a sliding window mechanism. Regardless of whether a plurality of RLC entities complete sending of data, the master base station is inquired of only according to a status of the transmit window, for example, the transmit window cannot slide backwards or the sent data is half of the size of the window. Alternatively, when a sending buffer of the RLC is empty, one piece of instruction information is fed back to the master base station, and the master base station can send the response information for the inquiry information to the PDCP entity of the user equipment without a need to send the inquiry information to the master base station by the PDCP entity of the user equipment. Alternatively, the PDCP entity of the user equipment may send the inquiry information to the master base station in another trigger condition. This is not limited in this application.

Figure 7:
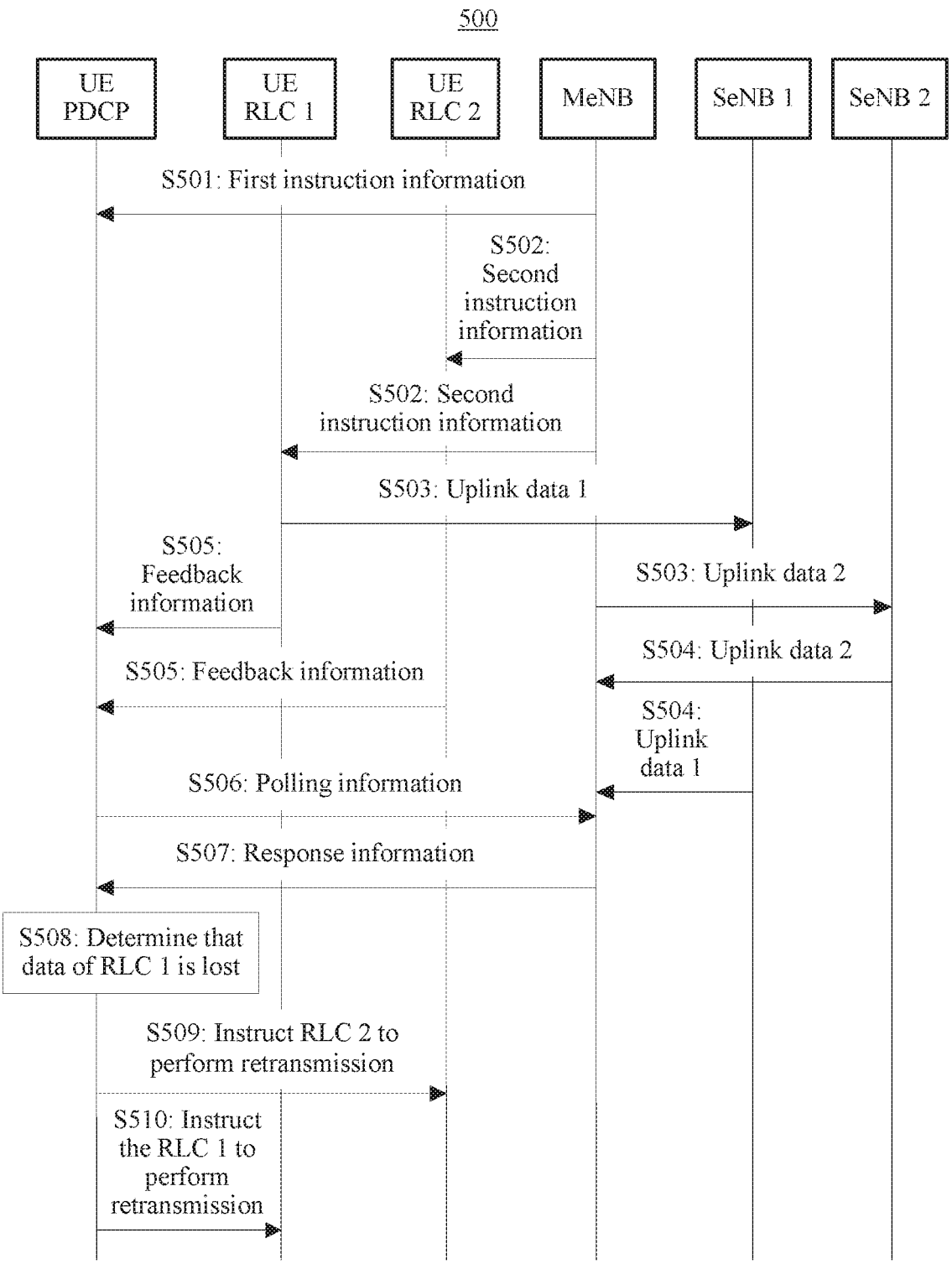
FIG. 7 is another schematic flowchart of a retransmission processing method according to an embodiment of this application.

It should be understood that FIG. 7 shows detailed steps or operations of the retransmission processing method. However, these steps or operations are merely examples. Another operation or a variant of each operation in FIG. 7 may also be performed in this embodiment of this application. In addition, the steps in FIG. 7 may be performed in an order different from that shown in FIG. 7, and not all the operations in FIG. 7 may be performed.

It should be further understood that sequence numbers of the foregoing processes do not mean execution orders in the embodiments of this application. The execution orders of the processes should be determined based on functions and internal logic of the processes, and should not be construed as any limitation on the implementation processes of the embodiments of this application.

It should be noted that the method for performing retransmission processing on downlink data is suitable for performing retransmission processing on uplink data. For brevity, refer to the embodiment of performing retransmission processing on downlink data. Details are not described herein again.

Therefore, according to the retransmission processing method provided in this embodiment of this application, retransmission processing is performed by the PDCP entity. This improves flexibility of selecting a retransmission link. The PDCP entity of the user equipment may estimate, in time based on sending statuses of a plurality of links, a data loss caused by degradation of quality of a link, and quickly initiate retransmission on another link, to shorten a reordering latency of the PDCP entity of the master base station. In addition, the RLC entity does not use the ARQ. The RLC entity does not need to perform inquiry interaction with the master base station on the plurality of links, but the PDCP entity of the user equipment performs inquiry interaction with the master base station instead. In a retransmission mechanism of the PDCP entity, a specific link for transmitting the data is not emphasized, but a current receiving status of the user equipment is inquired from an overall perspective. The master base station can respond to the inquiry information sent by the PDCP entity of the user equipment.

The retransmission processing method in the embodiments of this application is described above in detail with reference to FIG. 4 to FIG. 7. A retransmission processing apparatus in the embodiments of this application is described below with reference to FIG. 8 to FIG. 19. Technical features described in the method embodiments can be applied to the following apparatus embodiments.

Figure 8:
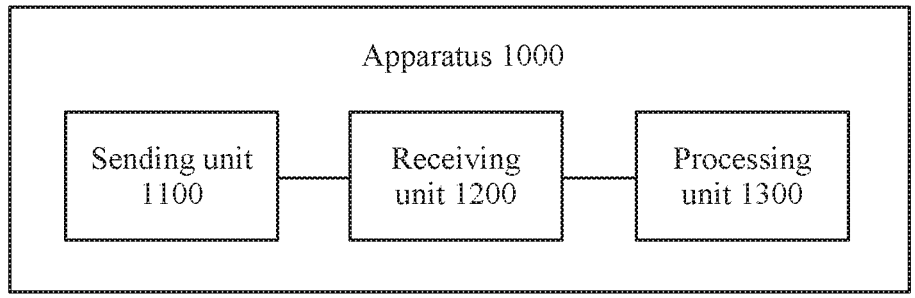
FIG. 8 is a schematic block diagram of a retransmission processing apparatus according to an embodiment of this application.

FIG. 8 is a schematic block diagram of a retransmission processing apparatus 1000 according to an embodiment of this application. As shown in FIG. 8, the apparatus 1000 includes:

a sending unit 1100, configured to send instruction information to a first secondary base station, where the instruction information is used to instruct the first secondary base station to send feedback information to the apparatus 1000 after the first secondary base station sends data to user equipment;

a receiving unit 1200, configured to receive the feedback information sent by the first secondary base station according to the instruction information, where the feedback information is used to indicate that the first secondary base station has sent the data to the user equipment; and a processing unit 1300, configured to perform retransmission processing on the data according to the feedback information.

It should be understood that there may be one or more first secondary base stations. This is not limited in this application. The apparatus 1000 may be a master base station in a multi-connection scenario.

To fully use multi-connection flexibility, and to enable the master base station to be capable of mastering a transmission status of each link in time, a retransmission function may be provided on a relatively high PDCP entity, and an RLC entity on each link immediately sends a feedback to a PDCP entity of the master base station after sending data, so that the PDCP entity of the master base station can fully use multi-link flexibility to select a more reliable link for retransmission. This avoids a relatively large reordering latency that is in receiving the data by the user equipment and that is caused by continuous use of a link with relatively poor quality.

Optionally, in this embodiment of this application, the processing unit 1300 is specifically configured to:

send inquiry information to the user equipment according to the feedback information, where the inquiry information is used to inquire whether the user equipment correctly receives the data sent by the first secondary base station;

receive response information that is sent by the user equipment and that is for the inquiry information; and perform retransmission processing on the data according to the response information for the inquiry information.

The retransmission processing apparatus provided in this embodiment of this application sends the inquiry information to the user equipment according to the feedback information, and performs retransmission processing according to the received response information for the inquiry information, so that the apparatus 1000 can detect, in time, whether each secondary base station loses data, and initiate retransmission by using another secondary base station with relatively desirable transmission quality when the data is lost. This can fully use multi-connection flexibility, so that a reordering latency is shortened.

Optionally, in this embodiment of this application, the instruction information is further used to instruct the first secondary base station not to perform retransmission processing on the data sent by the first secondary base station.

The secondary base station is instructed not to enable an ARQ function, and the apparatus 1000 may inquire of the user equipment about transmission statuses of a plurality of secondary base stations once. This avoids an air interface resource waste caused by interaction between each secondary base station and the user equipment.

Optionally, in this embodiment of this application, the processing unit 1300 is specifically configured to:

determine, according to the response information for the inquiry information, that the user equipment does not correctly receive the data sent by the first secondary base station; and send the data to a second secondary base station, where the second secondary base station is configured to send the data to the user equipment.

Similar to the first secondary base station, there may be one or more second secondary base stations. This application is not limited thereto.

Specifically, when a determining unit determines that the user equipment does not correctly receive the data sent by the first secondary base station, the determining unit may determine, based on a buffer status of another secondary base station or an amount of data unsuccessfully transmitted by the first secondary base station, that one or more second secondary base stations send the data to the user equipment.

When an amount of lost data is relatively large, the determining unit may select a suitable secondary base station for retransmission based on a data loss situation. This avoids a reordering latency caused by continuous use of a secondary base station in an undesirable transmission status.

Optionally, in this embodiment of this application, the processing unit 1300 is specifically configured to:

determine, according to the response information for the inquiry information, that the user equipment does not correctly receive the data sent by the first secondary base station; and send, by the master base station, a notification message to the first secondary base station, where the notification message is used to instruct the first secondary base station to resend the data to the user equipment.

When individual data is lost, rather than data is lost due to an unstable link, the data is retransmitted by using an original secondary base station. This can reduce interface traffic between base stations.

Optionally, in this embodiment of this application, that the determining unit sends inquiry information to the user equipment according to the feedback information includes: sending the inquiry information through a third secondary base station. That the determining unit receives response information that is sent by the user equipment and that is for the inquiry information includes: receiving, through the third secondary base station, the response information that is sent by the user equipment and that is for the inquiry information.

Optionally, in this embodiment of this application, the apparatus 1000 further includes:

an instruction unit, configured to instruct the user equipment to send the response information for the inquiry information to the apparatus 1000 through a fourth secondary base station.

The apparatus 1000 guides the user equipment, and may dynamically or statically indicate a path on which the user equipment sends the response information, so that the response information can be transmitted on a more reliable path, and multi-connection flexibility is fully used.

It should be understood that the apparatus 1000 in this embodiment of this application may correspond to the master base station in the retransmission processing method 200 and the retransmission processing method 300 in the embodiments of this application, and the foregoing and other operations and/or functions of the modules in the apparatus 1000 are separately used to implement corresponding procedures of the master base station in the methods in FIG. 4 and FIG. 5. For brevity, details are not described herein again.

Figure 9:
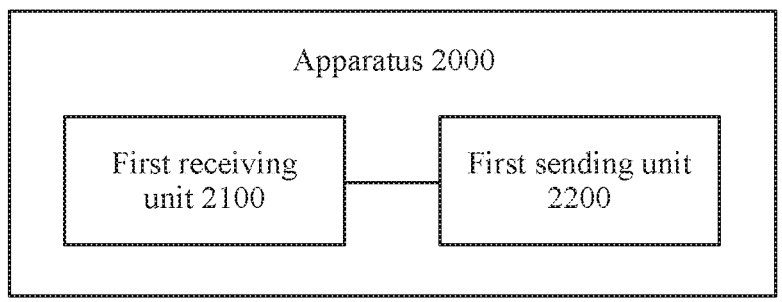
FIG. 9 is another schematic block diagram of a retransmission processing apparatus according to an embodiment of this application.

FIG. 9 shows a retransmission processing apparatus 2000 according to an embodiment of this application. As shown in FIG. 9, the apparatus 2000 includes:

a first receiving unit 2100, configured to receive instruction information sent by a master base station, where the instruction information is used to instruct a first secondary base station to send feedback information to the master base station after the first secondary base station sends first data to user equipment; and a first sending unit 2200, configured to send the feedback information to the master base station according to the instruction information after sending at least some of the first data to the user equipment, where the feedback information is used by the master base station to perform retransmission processing on the first data.

The apparatus 2000 is instructed to immediately send a feedback to the master base station after the apparatus 2000 sends the data to the user equipment, so that the master base station can master a sending status of each secondary base station in time. Therefore, a problem of an inflexible retransmission occasion can be overcome.

Optionally, in this embodiment of this application, the instruction information is further used to instruct the apparatus 2000 not to perform retransmission processing on the sent data, and the apparatus 2000 further includes: a configuration unit 2300, configured to skip performing retransmission processing on the sent data according to the instruction information.

The apparatus 2000 is instructed not to perform retransmission processing, and the master base station may inquire of the user equipment about transmission statuses of a plurality of apparatuses 2000 once. This avoids an air interface resource waste caused by interaction between each apparatus 2000 and the user equipment.

Optionally, in this embodiment of this application, the apparatus 2000 further includes:

a second receiving unit 2400, configured to receive a notification message sent by the master base station, where the notification message is used to instruct the apparatus 2000 to resend the first data to the user equipment.

When individual data is lost, rather than data is lost due to an unstable link, the data is retransmitted by using an original apparatus 2000. This can reduce interface traffic between base stations.

Optionally, in this embodiment of this application, the apparatus 2000 further includes:

a third receiving unit 2500, configured to receive second data that is sent by the master base station and that is unsuccessfully transmitted by another apparatus 2000; and a second sending unit 2600, configured to send the second data to the user equipment.

When an amount of lost data is relatively large, the master base station may select a suitable apparatus 2000 for retransmission based on a data loss situation. This avoids a reordering latency caused by continuous use of the apparatus 2000 in an undesirable transmission status.

It should be understood that the apparatus 2000 in this embodiment of this application may correspond to the first secondary base station in the retransmission processing method 200 and the retransmission processing method 300 in the embodiments of this application, and the foregoing and other operations and/or functions of the modules in the apparatus 2000 are separately used to implement corresponding procedures of the first secondary base station in the methods in FIG. 4 and FIG. 5. For brevity, details are not described herein again.

Figure 10:
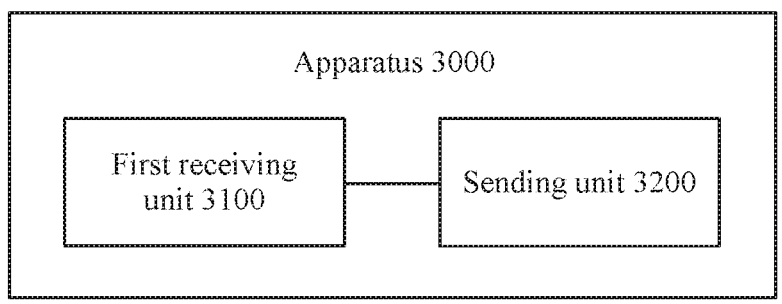
FIG. 10 is still another schematic block diagram of a retransmission processing apparatus according to an embodiment of this application.

FIG. 10 shows a retransmission processing apparatus 3000 according to an embodiment of this application. As shown in FIG. 10, the apparatus 3000 includes:

a first receiving unit 3100, configured to receive inquiry information sent by a master base station according to feedback information, where the feedback information is used to indicate that a first secondary base station has sent data to user equipment, and the inquiry information is used to inquire whether the user equipment correctly receives the data sent by the first secondary base station; and a sending unit 3200, configured to send response information for the inquiry information to the master base station.

It should be understood that there may be one or more first secondary base stations. This is not limited in this application.

The inquiry information sent by the master base station according to the feedback information is received, and the response information for the inquiry information is sent to the master base station, so that the master base station can detect, in time, whether each secondary base station loses data, and initiate retransmission by using another secondary base station with relatively desirable transmission quality when the data is lost. This can fully use multi-connection flexibility, so that a reordering latency is shortened.

Optionally, in this embodiment of this application, the first receiving unit 3100 is specifically configured to:

receive the inquiry information sent by the master base station by using a second secondary base station; and the sending unit 3200 is specifically configured to:

send the response information for the inquiry information to the master base station by using the second secondary base station.

Optionally, in this embodiment of this application, the apparatus 3000 further includes:

a second receiving unit 3300, configured to receive instruction information sent by the master base station, where the instruction information is used to instruct the apparatus 3000 to send the response information for the inquiry information to the master base station through a third secondary base station.

The master base station guides the apparatus 3000, and may dynamically or statically indicate a path on which the apparatus 3000 sends the response information, so that the response information can be transmitted on a more reliable path, and multi-connection flexibility is fully used.

It should be understood that the apparatus 3000 in this embodiment of this application may correspond to the user equipment in the retransmission processing method 200 and the retransmission processing method 300 in the embodiments of this application, and the foregoing and other operations and/or functions of the modules in the apparatus 3000 are separately used to implement corresponding procedures of the user equipment in the methods in FIG. 4 and FIG. 5. For brevity, details are not described herein again.

Therefore, according to the retransmission processing apparatus provided in this embodiment of this application, retransmission processing is performed by a PDCP entity. This improves flexibility of selecting a retransmission link. The master base station may estimate, in time based on sending statuses of a plurality of links, a data loss caused by degradation of quality of a link, and quickly initiate retransmission on another link, to shorten a reordering latency of a PDCP entity of the user equipment. In addition, an RLC entity does not use an ARQ. Inquiry information sent by the RLC entity to the user equipment on the plurality of links and a plurality of RLC status reports sent by the user equipment are replaced with one piece of response information used to respond to a PDCP entity of the master base station. The response information is used to indicate whether the data is correctly received. In a retransmission mechanism of the PDCP entity, a specific link for transmitting the data is not emphasized, but a current receiving status of the user equipment is inquired from an overall perspective. The user equipment can respond to the inquiry information sent by the PDCP entity of the master base station, and can select, under the guidance of a network, a path to send the response information for the inquiry information, so that the response information for the inquiry information is transmitted on a link with relatively desirable quality. This fully uses multi-connection flexibility.

Figure 11:
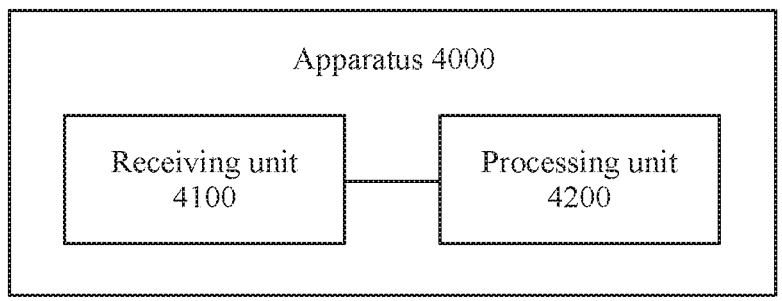
FIG. 11 is still another schematic block diagram of a retransmission processing apparatus according to an embodiment of this application.

FIG. 11 shows a retransmission processing apparatus 4000 according to an embodiment of this application. As shown in FIG. 11, the apparatus 4000 includes:

a receiving unit 4100, configured to receive feedback information sent by a first Radio Link Control RLC entity of user equipment, where the feedback information is used to indicate that the first RLC entity has sent data to a master base station; and a processing unit 4200, configured to perform retransmission processing on the data according to the feedback information.

The RLC entity of the user equipment immediately sends a feedback to the apparatus 4000 after sending the data to the master base station, so that the apparatus 4000 can master a sending status of each RLC entity of the user equipment in time. Therefore, a problem of an inflexible retransmission occasion can be overcome.

It should be understood that there may be one or more first RLC entities. This is not limited in this application.

Optionally, in this embodiment of this application, the processing unit 4200 is specifically configured to:

send inquiry information to the master base station according to the feedback information, where the inquiry information is used to inquire whether the master base station correctly receives the data sent by the first RLC entity of the user equipment; receive response information that is sent by the master base station and that is for the inquiry information; and perform retransmission processing on the data according to the response information for the inquiry information.

The inquiry information is sent to the master base station according to the feedback information, and retransmission processing is performed according to the received response information for the inquiry information, so that the apparatus 4000 can detect, in time, whether each RLC entity of the user equipment loses data, and initiate retransmission by using another RLC entity with relatively desirable transmission quality when the data is lost. This can fully use multi-connection flexibility, so that a reordering latency is shortened.

Optionally, in this embodiment of this application, the determining unit 4200 is specifically configured to:

determine, according to the response information for the inquiry information, that the master base station does not correctly receive the data sent by the first RLC entity of the user equipment; and send the data to a second RLC entity of the user equipment, where the second RLC entity of the user equipment is configured to send the data to the master base station.

When an amount of lost data is relatively large, the apparatus 4000 may select a suitable RLC entity for retransmission based on a data loss situation. This avoids a reordering latency caused by continuous use of an RLC entity in an undesirable transmission status.

Optionally, in this embodiment of this application, the determining unit 4200 is specifically configured to:

determine, according to the response information for the inquiry information, that the master base station does not correctly receive at least some of the data sent by the first RLC entity of the user equipment; and send a notification message to the first RLC entity of the user equipment, where the notification message is used to instruct the first RLC entity of the user equipment to resend the data.

Optionally, in this embodiment of this application, the determining unit 4200 is specifically configured to:

send the inquiry information to the master base station according to the feedback information and a status of a transmit window of the first RLC entity of the user equipment.

It should be understood that performing retransmission processing on downlink data and performing retransmission processing on uplink data belong to a same concept in the embodiments of this application. For a specific implementation process thereof, refer to the method embodiment in which downlink data is sent. Details are not described herein again.

Figure 12:
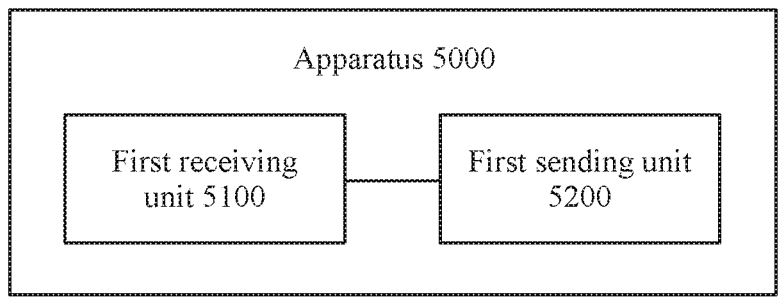
FIG. 12 is still another schematic block diagram of a retransmission processing apparatus according to an embodiment of this application.

FIG. 12 shows a retransmission processing apparatus 5000 according to an embodiment of this application. As shown in FIG. 12, the apparatus 5000 includes:

a first receiving unit 5100, configured to receive instruction information sent by a master base station, where the instruction information is used to instruct the apparatus 5000 to send feedback information to a PDCP entity of user equipment after the apparatus 5000 sends first data to the master base station; and a first sending unit 5200, configured to send the feedback information to the PDCP entity of the user equipment according to the instruction information after sending the first data to the master base station, where the feedback information is used by the PDCP entity of the user equipment to perform retransmission processing on the first data.

The apparatus 5000 is instructed to immediately send a feedback to the PDCP entity of the user equipment after sending the data to the master base station, so that the PDCP entity of the user equipment can master a sending status of each apparatus 5000 in time. Therefore, a problem of an inflexible retransmission occasion can be overcome.

Optionally, in this embodiment of this application, the instruction information is further used to instruct the apparatus 5000 not to perform retransmission processing on the data sent by the apparatus 5000, and the apparatus 5000 further includes:

a configuration unit 5300, configured to skip performing retransmission processing on the sent data according to the instruction information.

The apparatus 5000 is instructed not to perform retransmission processing on the first data, and the PDCP entity of the user equipment may inquire of the master base station about transmission statuses of a plurality of apparatuses 5000 once. This avoids an air interface resource waste caused by interaction between each apparatus 5000 and the master base station.

Optionally, in this embodiment of this application, the apparatus 5000 further includes:

a second receiving unit 5400, configured to receive a notification message sent by the PDCP entity of the user equipment, where the notification message is used to instruct the apparatus 5000 to resend the first data to the master base station.

Optionally, in this embodiment of this application, the apparatus 5000 further includes:

a third receiving unit 5500, configured to receive second data that is sent by the PDCP entity of the user equipment and that is unsuccessfully transmitted by another apparatus 5000; and a second sending unit 5600, configured to send the second data to the master base station.

When an amount of lost data is relatively large, the PDCP entity of the user equipment may select a suitable apparatus 5000 for retransmission based on a data loss situation. This avoids a relatively large reordering latency caused by continuous use of the apparatus 5000 in an undesirable transmission status.

Figure 13:
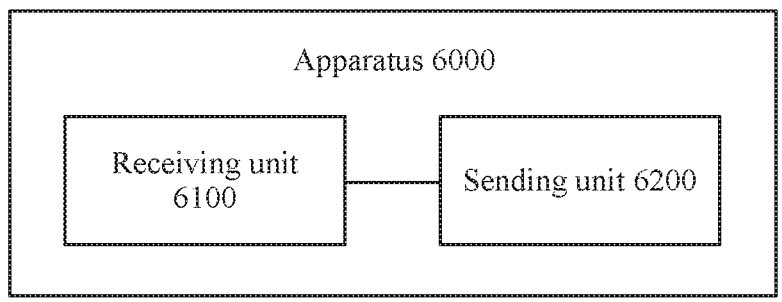
FIG. 13 is still another schematic block diagram of a retransmission processing apparatus according to an embodiment of this application.

FIG. 13 shows a retransmission processing apparatus 6000 according to an embodiment of this application. As shown in FIG. 13, the apparatus 6000 includes:

a receiving unit 6100, configured to receive inquiry information sent by a PDCP entity of user equipment, where the inquiry information is used to inquire whether the apparatus 6000 correctly receives data sent by a first RLC entity of the user equipment; and a sending unit 6200, configured to send response information for the inquiry information to the PDCP entity of the user equipment.

The inquiry information sent by the PDCP entity of the user equipment according to feedback information is received, and the response information for the inquiry information is sent to the PDCP entity of the user equipment, so that the PDCP entity of the user equipment can detect, in time, whether each RLC entity loses data, and initiate retransmission by using another RLC entity with relatively desirable transmission quality when the data is lost. This can fully use multi-connection flexibility, so that a reordering latency is shortened.

Therefore, according to the retransmission processing apparatus provided in this embodiment of this application, retransmission processing is performed by the PDCP entity. This improves flexibility of selecting a retransmission link. The PDCP entity of the user equipment may estimate, in time based on sending statuses of a plurality of links, a data loss caused by degradation of quality of a link, and quickly initiate retransmission on another link, to shorten a reordering latency of a PDCP entity of a master base station. In addition, the RLC entity does not use an ARQ. The RLC entity does not need to perform inquiry interaction with the master base station on the plurality of links, but the PDCP entity of the user equipment performs inquiry interaction with the master base station instead. In a retransmission mechanism of the PDCP entity, a specific link for transmitting the data is not emphasized, but a current receiving status of the user equipment is inquired from an overall perspective. The master base station can respond to the inquiry information sent by the PDCP entity of the user equipment.

It should be noted that when functions of the apparatus provided in the foregoing embodiment are implemented, division of the foregoing functional units is merely used as an example for description. During actual application, the foregoing functions may be allocated to different functional units for implementation as required. In other words, an internal structure of a device is divided into different functional units, to complete all or some of the functions described above. In addition, the apparatus provided in the foregoing embodiment pertains to a same concept as the method embodiment. For a specific implementation process of the apparatus, refer to the method embodiment. Details are not described herein again.

Figure 14:
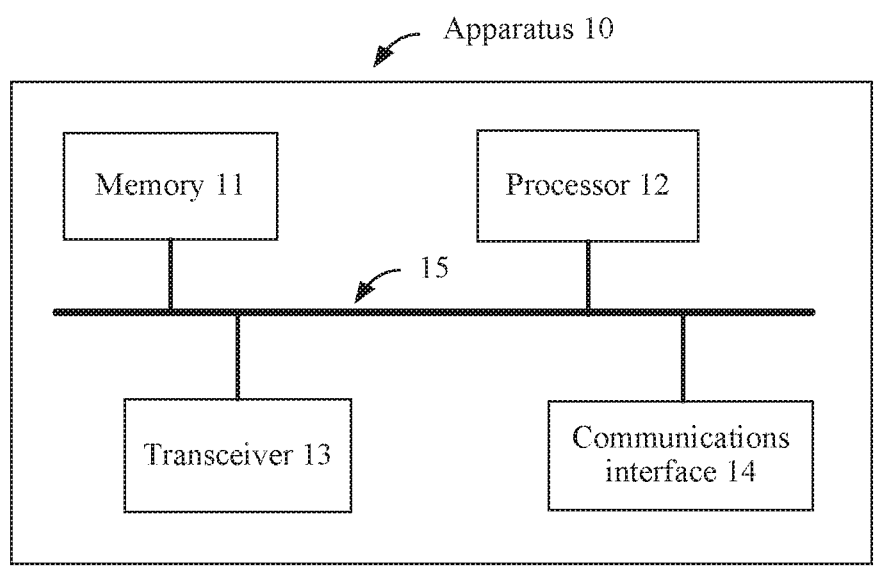
FIG. 14 is still another schematic block diagram of a retransmission processing apparatus according to an embodiment of this application.

FIG. 14 is a schematic block diagram of an apparatus 10 according to an embodiment of this application. The apparatus 10 shown in FIG. 14 includes a memory 11, a processor 12, a transceiver 13, a communications interface 14, and a bus system 15. The memory 11, the processor 12, the transceiver 13, and the communications interface 14 are connected by using the bus system 15. The memory 11 is configured to store an instruction. The processor 12 is configured to execute the instruction stored in the memory 11, to control the transceiver 13 to receive entered data and entered information, output data such as an operation result, and control the communications interface 14 to send a signal.

The processor 12 is configured to: send instruction information to a first secondary base station by using the transceiver, where the instruction information is used to instruct the first secondary base station to send feedback information to the processor after the first secondary base station sends data to user equipment; receive, by using the transceiver, the feedback information sent by the first secondary base station according to the instruction information; and perform retransmission processing on the data according to the feedback information.

It should be understood that, in this embodiment of this application, the processor 12 may be a general purpose central processing unit (Central Processing Unit, CPU), a microprocessor, an application-specific integrated circuit (Application-Specific Integrated Circuit, ASIC), or one or more integrated circuits, and is configured to execute a related program, to implement the technical solution provided in this embodiment of this application.

It should be further understood that the communications interface 14 uses a transceiver apparatus such as a transceiver to implement communication between the apparatus 10 and another device or a communications network. The transceiver apparatus is not limited to the transceiver.

The memory 11 may include a read-only memory and a random access memory, and provide an instruction and data for the processor 12. A part of the processor 12 may further include a non-volatile random access memory. For example, the processor 12 may further store device type information.

In addition to a data bus, the bus system 15 may include a power bus, a control bus, a status signal bus, and the like. However, for clarity of description, various buses are marked as the bus system 15 in the figure.

During implementation, each step of the foregoing method may be completed by using an integrated logic circuit of hardware in the processor 12 or an instruction in a form of software. The wireless communication method disclosed with reference to the embodiments of this application may be directly performed and completed by a hardware processor, or may be performed and completed by using a combination of hardware in the processor and software modules. The software module may be located in a mature storage medium in the art, such as a random access memory, a flash memory, a read-only memory, a programmable read-only memory, an electrically-erasable programmable memory, or a register. The storage medium is located in the memory 11. The processor 12 reads information in the memory 11 and implements the steps of the foregoing method in combination with the hardware in the processor 12. To avoid repetition, details are not described herein again.

It should be understood that the apparatus 10 in this embodiment of this application may correspond to the master base station in the retransmission processing methods in the embodiments of this application, and may correspond to the apparatus 1000 in the embodiments of this application. Moreover, the foregoing and other operations and/or functions of the modules in the apparatus 1000 are separately used to implement corresponding procedures in the methods in FIG. 4 and FIG. 5. For brevity, details are not described herein again.

Figure 15:
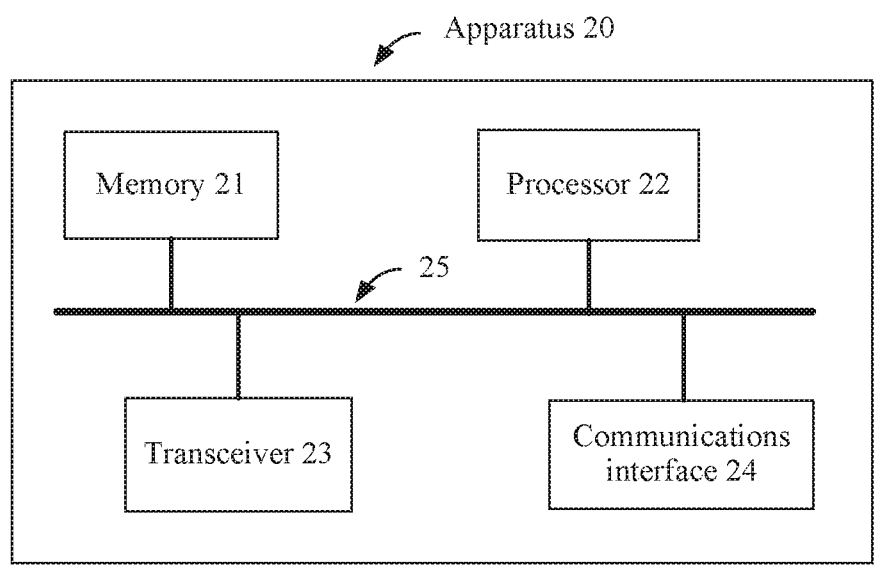
FIG. 15 is still another schematic block diagram of a retransmission processing apparatus according to an embodiment of this application.

FIG. 15 is a schematic block diagram of an apparatus 20 according to an embodiment of this application. The apparatus 20 shown in FIG. 15 includes a memory 21, a processor 22, a transceiver 23, a communications interface 24, and a bus system 25. The memory 21, the processor 22, the transceiver 23, and the communications interface 24 are connected by using the bus system 25. The memory 21 is configured to store an instruction. The processor 22 is configured to execute the instruction stored in the memory 21, to control the transceiver 23 to receive entered data and entered information, output data such as an operation result, and control the communications interface 24 to send a signal.

The processor 22 is configured to: receive, by using the transceiver, instruction information sent by a master base station, where the instruction information is used to instruct a first secondary base station to send feedback information to the master base station after the first secondary base station sends first data to user equipment; and send the feedback information to the master base station according to the instruction information by using the transceiver after sending the first data to the user equipment, where the feedback information is used by the master base station to perform retransmission processing on the first data.

It should be understood that, in this embodiment of this application, the processor 22 may be a general purpose central processing unit (Central Processing Unit, CPU), a microprocessor, an application-specific integrated circuit (Application-Specific Integrated Circuit, ASIC), or one or more integrated circuits, and is configured to execute a related program, to implement the technical solution provided in this embodiment of this application.

It should be further understood that the communications interface 24 uses a transceiver apparatus such as a transceiver to implement communication between the apparatus 20 and another device or a communications network. The transceiver apparatus is not limited to the transceiver.

The memory 21 may include a read-only memory and a random access memory, and provide an instruction and data for the processor 22. A part of the processor 22 may further include a non-volatile random access memory. For example, the processor 22 may further store device type information.

In addition to a data bus, the bus system 25 may include a power bus, a control bus, a status signal bus, and the like.

However, for clarity of description, various buses are marked as the bus system 25 in the figure.

During implementation, each step of the foregoing method may be completed by using an integrated logic circuit of hardware in the processor 22 or an instruction in a form of software. The wireless communication method disclosed with reference to the embodiments of this application may be directly performed and completed by a hardware processor, or may be performed and completed by using a combination of hardware in the processor and software modules. The software module may be located in a mature storage medium in the art, such as a random access memory, a flash memory, a read-only memory, a programmable read-only memory, an electrically-erasable programmable memory, or a register. The storage medium is located in the memory 21. The processor 22 reads information in the memory 21 and implements the steps of the foregoing method in combination with the hardware in the processor 22. To avoid repetition, details are not described herein again.

It should be understood that the apparatus 20 in this embodiment of this application may correspond to the first secondary base station in the retransmission processing methods in the embodiments of this application, and may correspond to the apparatus 2000 in the embodiments of this application. Moreover, the foregoing and other operations and/or functions of the modules in the apparatus 2000 are separately used to implement corresponding procedures in the methods in FIG. 4 and FIG. 5. For brevity, details are not described herein again.

Figure 16:
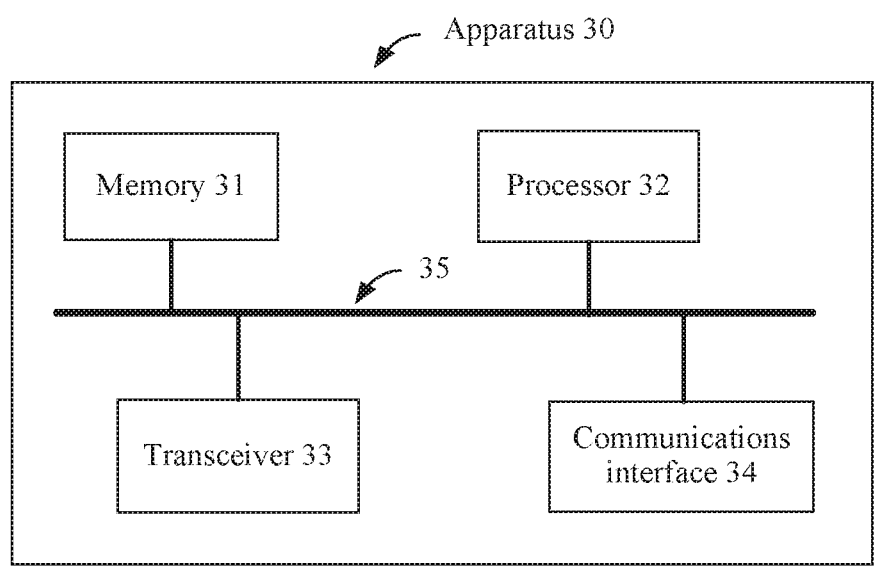
FIG. 16 is still another schematic block diagram of a retransmission processing apparatus according to an embodiment of this application.

FIG. 16 is a schematic block diagram of an apparatus 30 according to an embodiment of this application. The apparatus 30 shown in FIG. 16 includes a memory 31, a processor 32, a transceiver 33, a communications interface 34, and a bus system 35. The memory 31, the processor 32, the transceiver 33, and the communications interface 34 are connected by using the bus system 35. The memory 31 is configured to store an instruction. The processor 32 is configured to execute the instruction stored in the memory 31, to control the transceiver 33 to receive entered data and entered information, output data such as an operation result, and control the communications interface 34 to send a signal.

The processor 32 is configured to: receive, by using the transceiver, inquiry information sent by a master base station according to feedback information, where the feedback information is used to indicate that a first secondary base station has sent data to user equipment, and the inquiry information is used to inquire whether the user equipment correctly receives the data sent by the first secondary base station; and send response information for the inquiry information to the master base station by using the transceiver.

It should be understood that, in this embodiment of this application, the processor 32 may be a general purpose central processing unit (Central Processing Unit, CPU), a microprocessor, an application-specific integrated circuit (Application-Specific Integrated Circuit, ASIC), or one or more integrated circuits, and is configured to execute a related program, to implement the technical solution provided in this embodiment of this application.

It should be further understood that the communications interface 34 uses a transceiver apparatus such as a transceiver, to implement communication between the apparatus 30 and another device or a communications network. The transceiver apparatus is not limited to the transceiver.

The memory 31 may include a read-only memory and a random access memory, and provide an instruction and data for the processor 32. A part of the processor 32 may further include a non-volatile random access memory. For example, the processor 32 may further store device type information.

In addition to a data bus, the bus system 35 may include a power bus, a control bus, a status signal bus, and the like. However, for clarity of description, various buses are marked as the bus system 35 in the figure.

During implementation, each step of the foregoing method may be completed by using an integrated logic circuit of hardware in the processor 32 or an instruction in a form of software. The wireless communication method disclosed with reference to the embodiments of this application may be directly performed and completed by a hardware processor, or may be performed and completed by using a combination of hardware in the processor and software modules. The software module may be located in a mature storage medium in the art, such as a random access memory, a flash memory, a read-only memory, a programmable read-only memory, an electrically-erasable programmable memory, or a register. The storage medium is located in the memory 31. The processor 32 reads information in the memory 31 and implements the steps of the foregoing method in combination with the hardware in the processor 32. To avoid repetition, details are not described herein again.

It should be understood that the apparatus 30 in this embodiment of this application may correspond to the user equipment in the retransmission processing methods in the embodiments of this application, and may correspond to the apparatus 3000 in the embodiments of this application. Moreover, the foregoing and other operations and/or functions of the modules in the apparatus 3000 are separately used to implement corresponding procedures in the methods in FIG. 4 and FIG. 5. For brevity, details are not described herein again.

Therefore, according to the retransmission processing apparatus provided in this embodiment of this application, retransmission processing is performed by a PDCP entity. This improves flexibility of selecting a retransmission link. The master base station may estimate, in time based on sending statuses of a plurality of links, a data loss caused by degradation of quality of a link, and quickly initiate retransmission on another link, to shorten a reordering latency of a PDCP entity of the user equipment. In addition, an RLC entity does not use an ARQ. Inquiry information sent by the RLC entity to the user equipment on the plurality of links and a plurality of RLC status reports sent by the user equipment are replaced with one piece of response information used to respond to a PDCP entity of the master base station. The response information is used to indicate whether the data is correctly received. In a retransmission mechanism of the PDCP entity, a specific link for transmitting the data is not emphasized, but a current receiving status of the user equipment is inquired from an overall perspective. The user equipment can respond to the inquiry information sent by the PDCP entity of the master base station, and can select, under the guidance of a network, a path to send the response information for the inquiry information, so that the response information for the inquiry information is transmitted on a link with relatively desirable quality. This fully uses multi-connection flexibility.

Figure 17:
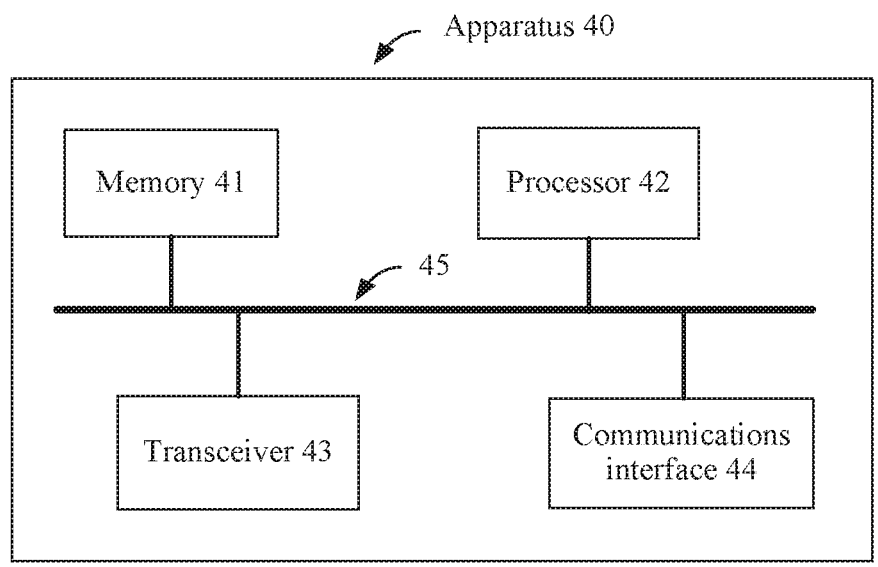
FIG. 17 is still another schematic block diagram of a retransmission processing apparatus according to an embodiment of this application.

FIG. 17 is a schematic block diagram of an apparatus 40 according to an embodiment of this application. The apparatus 40 shown in FIG. 17 includes a memory 41, a processor 42, a transceiver 43, a communications interface 44, and a bus system 45. The memory 41, the processor 42, the transceiver 43, and the communications interface 44 are connected by using the bus system 45. The memory 41 is configured to store an instruction. The processor 42 is configured to execute the instruction stored in the memory 41, to control the transceiver 43 to receive entered data and entered information, output data such as an operation result, and control the communications interface 44 to send a signal.

The processor 42 is configured to: receive feedback information sent by a first Radio Link Control RLC entity of user equipment, where the feedback information is used to indicate that the first RLC entity has sent data to a master base station; and perform retransmission processing on the data according to the feedback information.

It should be understood that, in this embodiment of this application, the processor 42 may be a general purpose central processing unit (Central Processing Unit, CPU), a microprocessor, an application-specific integrated circuit (Application-Specific Integrated Circuit, ASIC), or one or more integrated circuits, and is configured to execute a related program, to implement the technical solution provided in this embodiment of this application.

It should be further understood that the communications interface 44 uses a transceiver apparatus such as a transceiver to implement communication between the apparatus 40 and another device or a communications network. The transceiver apparatus is not limited to the transceiver.

The memory 41 may include a read-only memory and a random access memory, and provide an instruction and data for the processor 42. A part of the processor 42 may further include a non-volatile random access memory. For example, the processor 42 may further store device type information.

In addition to a data bus, the bus system 45 may include a power bus, a control bus, a status signal bus, and the like. However, for clarity of description, various buses are marked as the bus system 45 in the figure.

During implementation, each step of the foregoing method may be completed by using an integrated logic circuit of hardware in the processor 42 or an instruction in a form of software. The wireless communication method disclosed with reference to the embodiments of this application may be directly performed and completed by a hardware processor, or may be performed and completed by using a combination of hardware in the processor and software modules. The software module may be located in a mature storage medium in the art, such as a random access memory, a flash memory, a read-only memory, a programmable read-only memory, an electrically-erasable programmable memory, or a register. The storage medium is located in the memory 41. The processor 42 reads information in the memory 41 and implements the steps of the foregoing method in combination with the hardware in the processor 42. To avoid repetition, details are not described herein again.

It should be understood that the apparatus 40 in this embodiment of this application may correspond to the PDCP entity of the user equipment in the retransmission processing methods in the embodiments of this application, and may correspond to the apparatus 4000 in the embodiments of this application. Moreover, the foregoing and other operations and/or functions of the modules in the apparatus 4000 are separately used to implement corresponding procedures in the method in FIG. 7. For brevity, details are not described herein again.

Figure 18:
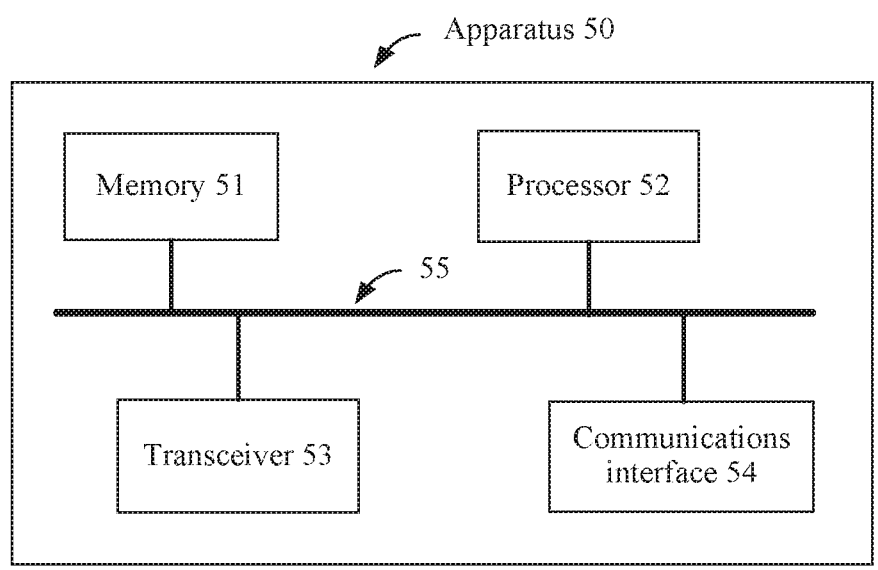
FIG. 18 is still another schematic block diagram of a retransmission processing apparatus according to an embodiment of this application.

FIG. 18 is a schematic block diagram of an apparatus 50 according to an embodiment of this application. The apparatus 50 shown in FIG. 18 includes a memory 51, a processor 52, a transceiver 53, a communications interface 54, and a bus system 55. The memory 51, the processor 52, the transceiver 53, and the communications interface 54 are connected by using the bus system 55. The memory 51 is configured to store an instruction. The processor 52 is configured to execute the instruction stored in the memory 51, to control the transceiver 53 to receive entered data and entered information, output data such as an operation result, and control the communications interface 54 to send a signal.

The processor 52 is configured to: receive instruction information sent by a master base station, where the instruction information is used to instruct a first RLC entity of user equipment to send feedback information to a PDCP entity of the user equipment after the first RLC entity sends first data to the master base station; and send the feedback information to the PDCP entity of the user equipment according to the instruction information after sending the first data to the master base station, where the feedback information is used by the PDCP entity of the user equipment to perform retransmission processing on the first data.

It should be understood that, in this embodiment of this application, the processor 52 may be a general purpose central processing unit (Central Processing Unit, CPU), a microprocessor, an application-specific integrated circuit (Application-Specific Integrated Circuit, ASIC), or one or more integrated circuits, and is configured to execute a related program, to implement the technical solution provided in this embodiment of this application.

It should be further understood that the communications interface 54 uses a transceiver apparatus such as a transceiver to implement communication between the apparatus 50 and another device or a communications network. The transceiver apparatus is not limited to the transceiver.

The memory 51 may include a read-only memory and a random access memory, and provide an instruction and data for the processor 52. A part of the processor 52 may further include a non-volatile random access memory. For example, the processor 52 may further store device type information.

In addition to a data bus, the bus system 55 may include a power bus, a control bus, a status signal bus, and the like. However, for clarity of description, various buses are marked as the bus system 55 in the figure.

During implementation, each step of the foregoing method may be completed by using an integrated logic circuit of hardware in the processor 52 or an instruction in a form of software. The wireless communication method disclosed with reference to the embodiments of this application may be directly performed and completed by a hardware processor, or may be performed and completed by using a combination of hardware in the processor and software modules. The software module may be located in a mature storage medium in the art, such as a random access memory, a flash memory, a read-only memory, a programmable read-only memory, an electrically-erasable programmable memory, or a register. The storage medium is located in the memory 51. The processor 52 reads information in the memory 51 and implements the steps of the foregoing method in combination with the hardware in the processor 52. To avoid repetition, details are not described herein again.

It should be understood that the apparatus 50 in this embodiment of this application may correspond to the first RLC entity of the user equipment in the retransmission processing methods in the embodiments of this application, and may correspond to the apparatus 5000 in the embodiments of this application. Moreover, the foregoing and other operations and/or functions of the modules in the apparatus 5000 are separately used to implement corresponding procedures in the method in FIG. 7. For brevity, details are not described herein again.

Figure 19:
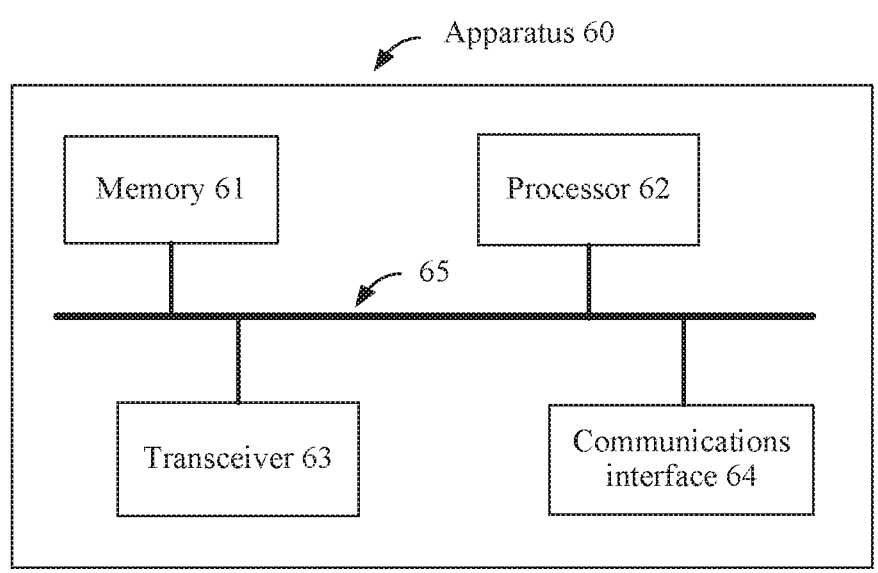
FIG. 19 is still another schematic block diagram of a retransmission processing apparatus according to an embodiment of this application.

FIG. 19 is a schematic block diagram of an apparatus 60 according to an embodiment of this application. The apparatus 60 shown in FIG. 19 includes a memory 61, a processor 62, a transceiver 63, a communications interface 64, and a bus system 65. The memory 61, the processor 62, the transceiver 63, and the communications interface 64 are connected by using the bus system 65. The memory 61 is configured to store an instruction. The processor 62 is configured to execute the instruction stored in the memory 61, to control the transceiver 63 to receive entered data and entered information, output data such as an operation result, and control the communications interface 64 to send a signal.

The processor 62 is configured to: receive inquiry information sent by a PDCP entity of user equipment, where the inquiry information is used to inquire whether a master base station correctly receives data sent by a first RLC entity of the user equipment; and send response information for the inquiry information to the PDCP entity of the user equipment.

It should be understood that, in this embodiment of this application, the processor 62 may be a general purpose central processing unit (Central Processing Unit, CPU), a microprocessor, an application-specific integrated circuit (Application-Specific Integrated Circuit, ASIC), or one or more integrated circuits, and is configured to execute a related program, to implement the technical solution provided in this embodiment of this application.

It should be further understood that the communications interface 64 uses a transceiver apparatus such as a transceiver to implement communication between the apparatus 60 and another device or a communications network. The transceiver apparatus is not limited to the transceiver.

The memory 61 may include a read-only memory and a random access memory, and provide an instruction and data for the processor 62. A part of the processor 62 may further include a non-volatile random access memory. For example, the processor 62 may further store device type information.

In addition to a data bus, the bus system 65 may include a power bus, a control bus, a status signal bus, and the like. However, for clarity of description, various buses are marked as the bus system 65 in the figure.

During implementation, each step of the foregoing method may be completed by using an integrated logic circuit of hardware in the processor 62 or an instruction in a form of software. The wireless communication method disclosed with reference to the embodiments of this application may be directly performed and completed by a hardware processor, or may be performed and completed by using a combination of hardware in the processor and software modules. The software module may be located in a mature storage medium in the art, such as a random access memory, a flash memory, a read-only memory, a programmable read-only memory, an electrically-erasable programmable memory, or a register. The storage medium is located in the memory 61. The processor 62 reads information in the memory 61 and implements the steps of the foregoing method in combination with the hardware in the processor 62. To avoid repetition, details are not described herein again.

It should be understood that the apparatus 60 in this embodiment of this application may correspond to the master base station in the retransmission processing methods in the embodiments of this application, and may correspond to the apparatus 6000 in the embodiments of this application. Moreover, the foregoing and other operations and/or functions of the modules in the apparatus 6000 are separately used to implement corresponding procedures in the method in FIG. 7. For brevity, details are not described herein again.

Therefore, according to the retransmission processing apparatus provided in this embodiment of this application, retransmission processing is performed by the PDCP entity. This improves flexibility of selecting a retransmission link. The PDCP entity of the user equipment may estimate, in time based on sending statuses of a plurality of links, a data loss caused by degradation of quality of a link, and quickly initiate retransmission on another link, to shorten a reordering latency of a PDCP entity of the master base station. In addition, an RLC entity does not use an ARQ. The RLC entity does not need to perform inquiry interaction with the master base station on the plurality of links, but the PDCP entity of the user equipment performs inquiry interaction with the master base station instead. In a retransmission mechanism of the PDCP entity, a specific link for transmitting the data is not emphasized, but a current receiving status of the user equipment is inquired from an overall perspective. The master base station can respond to the inquiry information sent by the PDCP entity of the user equipment.

It should be understood that in the embodiments of this application, "B corresponding to A" indicates that B is associated with A, and B may be determined according to A. However, it should be further understood that determining B according to A does not mean that B is determined according to A only; that is, B may also be determined according to A and/or other information.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution orders in the embodiments of this application. The execution orders of the processes should be determined based on functions and internal logic of the processes, and should not be construed as any limitation on the implementation processes of the embodiments of this application.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual needs to achieve the objectives of the solutions of the embodiments.

In addition, functional units in the embodiments of this application may be integrated into one processing module, or each of the units may exist alone physically, or two or more units are integrated into one unit.

When the functions are implemented in a form of a software functional unit and sold or used as an independent product, the functions may be stored in a computer-readable storage medium. According to such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of retransmission processing, comprising:
   sending, by a master base station to a first secondary base station, instruction information used to instruct the first secondary base station to send feedback information to the master base station after the first secondary base station sends data to a terminal device;
   receiving, by the master base station from the first secondary base station according to the instruction information, the feedback information used to indicate that the first secondary base station has sent the data to the terminal device;
   sending, by the master base station to the terminal device according to the feedback information, inquiry information used to inquire whether the terminal device correctly receives the data sent by the first secondary base station to the terminal device;
   receiving, by the master base station from the terminal device, response information based on the inquiry information; and
   performing, by the master base station and according to the response information, retransmission processing on the data according to the response information.

2. The method according to claim 1, wherein the performing, by the master base station, the retransmission processing on the data comprises:
   determining, by the master base station according to the response information based on the inquiry information, that the terminal device does not correctly receive the data sent by the first secondary base station; and
   sending, by the master base station to a second secondary base station, the data, wherein the second secondary base station is configured to send the data to the terminal device.

3. The method according to claim 1, wherein the performing, by the master base station, the retransmission processing on the data comprises:
   determining, by the master base station according to the response information based on the inquiry information, that the terminal device does not correctly receive the data sent by the first secondary base station; and
   sending, by the master base station, a notification message to the first secondary base station, wherein the notification message is used to instruct the first secondary base station to resend the data to the terminal device.

4. The method according to claim 1, wherein the sending, by the master base station to the terminal device according to the feedback information, the inquiry information comprises:
   sending, by the master base station, the inquiry information to the terminal device through a third secondary base station;
   wherein the receiving, by the master base station from the terminal device, the response information based on the inquiry information comprises:
      receiving, by the master base station through the third secondary base station, the response information that is sent from the terminal device and that is based on the inquiry information.

5. The method according to claim 1, wherein before the receiving, by the master base station from the terminal device, the response information based on the inquiry information, the method further comprises:
   instructing, by the master base station, the terminal device to send the response information based on the inquiry information to the master base station through a fourth secondary base station.

6. The method according to claim 1, wherein the sending, by the master base station to the terminal device according to the feedback information, the inquiry information comprises:
   sending, by the master base station to the terminal device according to the feedback information, the inquiry information and a status of a transmit window of the first secondary base station.

7. The method according to claim 1, wherein the instruction information is further used to instruct the first secondary base station not to perform retransmission processing on the data sent by the first secondary base station.

8. An apparatus, comprising:
   a memory configured to store instructions; and
   a processor in communication with the memory and configured to execute the instructions to configure the apparatus to perform the following:
      sending, to a first secondary base station, instruction information used to instruct the first secondary base station to send feedback information to the apparatus after the first secondary base station sends data to a terminal device;

receiving, from the first secondary base station according to the instruction information, the feedback information used to indicate that the first secondary base station has sent the data to the terminal device;

sending, to the terminal device according to the feedback information, inquiry information used to inquire whether the terminal device correctly receives the data sent by the first secondary base station to the terminal device;

receiving, from the terminal device, response information based on the inquiry information; and performing, according to the response information, retransmission processing on the data according to the response information.

9. The apparatus according to claim 8, wherein the performing the retransmission processing on the data comprises:

determining, according to the response information based on the inquiry information, that the terminal device does not correctly receive the data sent by the first secondary base station; and sending, to a second secondary base station, the data, wherein the second secondary base station is configured to send the data to the terminal device.

10. The apparatus according to claim 8, wherein the performing the retransmission processing on the data comprises:

determining, according to the response information based on the inquiry information, that the terminal device does not correctly receive the data sent by the first secondary base station; and sending a notification message to the first secondary base station, wherein the notification message is used to instruct the first secondary base station to resend the data to the terminal device.

11. The apparatus according to claim 8, wherein the sending, to the terminal device according to the feedback information, the inquiry information comprises:

sending the inquiry information to the terminal device through a third secondary base station;

wherein the receiving, from the terminal device, the response information based on the inquiry information comprises:

receiving, through the third secondary base station, the response information that is sent from the terminal device and that is based on the inquiry information.

12. The apparatus according to claim 8, wherein before the receiving, from the terminal device, the response information based on the inquiry information, executing the instructions configures the apparatus to perform the following:

instructing the terminal device to send the response information based on the inquiry information to apparatus through a fourth secondary base station.

13. The apparatus according to claim 8, wherein the sending, to the terminal device according to the feedback information, the inquiry information comprises:

sending, to the terminal device according to the feedback information, the inquiry information and a status of a transmit window of the first secondary base station.

14. The apparatus according to claim 8, wherein the instruction information is further used to instruct the first secondary base station not to perform retransmission processing on the data sent by the first secondary base station.

* * * * *